(12) United States Patent
Zhang et al.

(10) Patent No.: US 11,178,598 B2
(45) Date of Patent: Nov. 16, 2021

(54) METHODS TO SUPPORT CONFIGURED GRANT TRANSMISSION AND RETRANSMISSION

(71) Applicant: Telefonaktiebolaget LM Ericsson (publ), Stockholm (SE)

(72) Inventors: Jianwei Zhang, Solna (SE); Mattias Andersson, Sundbyberg (SE); Yufei Blankenship, Kildeer, IL (US); Sorour Falahati, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/906,721

(22) Filed: Jun. 19, 2020

(65) Prior Publication Data
US 2020/0322118 A1 Oct. 8, 2020

Related U.S. Application Data

(63) Continuation of application No. PCT/IB2019/058242, filed on Sep. 27, 2019.

(60) Provisional application No. 62/738,048, filed on Sep. 28, 2018.

(51) Int. Cl.
H04W 48/12 (2009.01)
H04W 48/16 (2009.01)
H04W 72/12 (2009.01)
H04W 72/14 (2009.01)
H04L 1/18 (2006.01)
H04L 5/00 (2006.01)
H04W 72/04 (2009.01)

(52) U.S. Cl.
CPC ........... *H04W 48/12* (2013.01); *H04L 1/1819* (2013.01); *H04L 5/0098* (2013.01); *H04W 48/16* (2013.01); *H04W 72/042* (2013.01); *H04W 72/1289* (2013.01); *H04W 72/14* (2013.01)

(58) Field of Classification Search
CPC .. H04L 5/0098; H04L 1/1819; H04W 72/042; H04W 72/14
See application file for complete search history.

(56) References Cited

U.S. PATENT DOCUMENTS

2012/0307758 A1* 12/2012 Moon ................... H04L 5/0055
370/329
2019/0373588 A1* 12/2019 Bae ....................... H04L 1/1812

OTHER PUBLICATIONS

International Search Report and Written Opinion dated Apr. 22, 2020 issued in International Application No. PCT/IB2019/058242. (20 pages).

(Continued)

Primary Examiner — Steven H Nguyen
(74) Attorney, Agent, or Firm — Rothwell, Figg Ernst & Manbeck, P.C.

(57) ABSTRACT

In one aspect there is a method performed by a wireless device, WD. The method includes: (1) the WD receiving a PUSCH-Config IE from a base station, wherein the PUSCH-Config IE includes a first set of PUSCH configuration parameters, wherein the first set of PUSCH configuration parameters includes at least one of the following: txConfig, maxRank, or codebookSubset; and (2) the WD transmitting data on the PUSCH corresponding to a configured grant using the first set of PUSCH configuration parameters.

9 Claims, 17 Drawing Sheets

(56) References Cited

OTHER PUBLICATIONS

Huawei et al., "Corrections on configured grant related procedures", 3GPP TSG RAN WG1 Meeting #94, R1-1808944, Gothenburg, Sweden, Aug. 20-24, 2018. (8 pages).
3GPP TS 38.331 V15.3.0 (Sep. 2018); 3rd Generation Partnership Project; Technical Specification Group Radio Access Network; NR; Radio Resource Control (RRC) protocol specification (Release 15), Sep. 2018. (445 pages).
LG Electronics, "Discussion on DL/UL data scheduling and HARQ procedure", 3GPP TSG RAN WG1 Meeting #94, R1-1808492, Gothenburg, Sweden, Aug. 20-24, 2018. (23 pages).
LG Electronics, "Remaining issues on UL data transmission procedure", 3GPP TSG RAN WG1 Meeting #93, R1-1806628, Busan, Korea, May 21-25, 2018. (21 pages).
Ericsson, "Maintenance issues of DL/UL scheduling and HARQ procedure", 3GPP TSG-RAN WG1 MEeting #94bis, Tdoc R1-1811490, Chengdu, China, Oct. 8-12, 2018. (14 pages).
3GPP TS 38.321 V15.3.0 (Sep. 2018); 3rd Generation Partnership Project; Technical Specification Group Radio Access Network; NR; Medium Access Control (MAC) protocol specification (Release 15), Sep. 2018. (76 pages).
3GPP TS 38.213 V15.2.0 (Jun. 2018); 3rd Generation Partnership Project; Technical Specification Group Radio Access Network; NR; Physical layer procedures for control (Release 15), Jun. 2018. (99 pages).
3GPP TS 38.212 V15.3.0 (Sep. 2018); 3rd Generation Partnership Project; Technical Specification Group Radio Access Network; NR; Multiplexing and channel coding (Release 15), Sep. 2018. (99 pages).

\* cited by examiner

DCI 0_1 ConfiguredGrantConfig for activation

| ID | | FDRA | TDRA | MCS | NDI | RV | HARQ | ... | Padding |
|----|--|------|------|-----|-----|----|----|-----|---------|

DCI 0_1 PUSCH-Config for retransmission

| ID | | FDRA | TDRA | FH | MCS | NDI | RV | HARQ | ... |
|----|--|------|------|----|-----|-----|----|------|-----|

FIG. 17

METHODS TO SUPPORT CONFIGURED GRANT TRANSMISSION AND RETRANSMISSION

CROSS-REFERENCE TO RELATED APPLICATIONS

This application is a continuation of International Patent Application No. PCT/IB2019/058242, filed on Sep. 27, 2019, which claims priority to U.S. provisional patent application No. 62/738,048, filed on Sep. 28, 2018. The above identified applications are incorporated by this reference.

TECHNICAL FIELD

This disclosure relates to supporting configured grant transmission and retransmission.

BACKGROUND

1. PUSCH Transmission

PUSCH transmissions can be: (1) dynamically scheduled by an UL grant in a Downlink Control Information (DCI) (this is referred to as a Dynamic Grant); (2) semi-statically configured and scheduled by higher layer parameters without detection of an UL grant in a DCI (this is referred to as a Type 1 Configured Grant); or (3) semi-statically configured by higher layer parameters and semi-persistently scheduled by an UL grant in a DCI (this is referred to as a Type 2 Configured Grant).

The higher layer RRC parameters to apply for a Dynamic Grant and the higher layer RRC parameters to apply for a Configured Grant are defined in 3GPP TS 38.331 15.3.0 ("TS 38.331") in information elements (IEs) PUSCH-Config and ConfiguredGrantConfig, respectively.

As explained in TS 38.331, "[t]he IE ConfiguredGrant-Config is used to configure uplink transmission without dynamic grant according to two possible schemes. The actual uplink grant may either be configured via RRC (type1) or provided via the PDCCH (addressed to CS-RNTI) (type2)." The ConfiguredGrantConfig IE as defined in TS 38.331 at section 6.3.2 is shown below:

```
-- ASN1 START
-- TAG-CONFIGUREDGRANTCONFIG-START
ConfiguredGrantConfig ::=           SEQUENCE {
    frequencyHopping                    ENUMERATED {intraSlot, interSlot}               OPTIONAL, -- Need S,
    cg-DMRS-Configuration               DMRS-UplinkConfig,
    mcs-Table                           ENUMERATED {qam256, qam64LowSE}                 OPTIONAL, -- Need S
    mcs-TableTransformPrecoder          ENUMERATED {qam256, qam64LowSE }                OPTIONAL, -- Need S
    uci-OnPUSCH                         SetupRelease { CG-UCI-OnPUSCH }                 OPTIONAL, -- Need M
    resourceAllocation                  ENUMERATED { resourceAllocationTypeO, resourceAllocationType1, dynamicSwitch },
    rbg-Size                            ENUMERATED {config2}                            OPTIONAL, -- Need S
    powerControlLoopToUse               ENUMERATED {n0, n1},
    p0-PUSCH-Alpha                      P0-PUSCH-AlphaSetId,
    transformPrecoder                   ENUMERATED {enabled, disabled}                  OPTIONAL, -- Need S
    nrofHARQ-Processes                  INTEGER(1..16),
    repK                                ENUMERATED {nl, n2, n4, n8},
    repK-RV                             ENUMERATED {s1-0231, s2-0303, s3-0000}          OPTIONAL, -- Need R
    periodicity                         ENUMERATED {
        sym2, sym7, sym1x14, sym2x14, sym4x14, sym5x14, sym8x14, sym10x14, sym16x14, sym20x14, sym32x14,
        sym40x14, sym64x14, sym80x14, sym128x14, sym160x14, sym256x14, sym320x14, sym512x14, sym640x14,
        sym1024x14, sym1280x14, sym2560x14, sym5120x14, sym6, sym1x12, sym2x12, sym4x12, sym5x12, sym8x12,
        sym10x12, sym16x12, sym20x12, sym32x12, sym40x12, sym64x12, sym80x12, sym128x12, sym160x12,
        sym256x12, sym320x12, sym512x12, sym640x12, sym1280x12, sym2560x12
    },
    configuredGrantTimer                INTEGER (1..64)                                 OPTIONAL, -- Need R
    rrc-ConfiguredUplinkGrant           SEQUENCE {
        timeDomainOffset                    INTEGER (0..5119),
        timeDomainAllocation                INTEGER (0..15),
        frequencyDomainAllocation           BIT STRING (SIZE(18)),
        antennaPort                         INTEGER (0..31),
        dmrs-SeqInitialization              INTEGER (0..1)                              OPTIONAL, -- Need R
        precodingAndNumberOfLayers          INTEGER (0..63),
        srs-ResourceIndicator               INTEGER (0..15)                             OPTIONAL, -- Need R
        mcsAndTBS                           INTEGER (0..31),
        frequencyHoppingOffset              INTEGER (1.. maxNrofPhysicalResourceBlocks-1)   OPTIONAL, -- Need R
        pathlossReferenceIndex              INTEGER (0..maxNrofPUSCH-PathlossReferenceRSs-1),
        ...
    }                                                                                   OPTIONAL, -- Need R
    ...
}
CG-UCI-OnPUSCH ::= CHOICE {
    dynamic         SEQUENCE (SIZE (1..4)) OF BetaOffsets,
    semiStatic      BetaOffsets
}-- TAG-CONFIGUREDGRANTCONFIG-STOP
-- ASN1STOP
```

The descriptions for the fields (parameters) included in the ConfiguredGrantConfig IE are provided below:

---

ConfiguredGrantConfig field descriptions

--- antennaPort
Indicates the antenna port(s) to be used for this configuration, and the maximum bitwidth is 5. See 3GPP TS 38.214 ("TS 38.214"), section 6.1.2, and TS 38.212, section 7.3.1.
cg-DMRS-Configuration
DMRS configuration, corresponds to L1 parameter 'UL-TWG-DMRS' (see TS 38.214, section 6.1.2).
configuredGrantTimer
Indicates the initial value of the configured grant timer (see TS 38.321,) in number of periodicities.
dmrs-SeqInitialization
The network configures this field if transformPrecoder is disabled. Otherwise the field is absent.
frequencyDomainAllocation
Indicates the frequency domain resource allocation, see TS 38.214, section 6.1.2, and TS 38.212, section 7.3.1).
frequencyHopping
The value intraSlot enables 'Intra-slot frequency hopping' and the value interSlot enables 'Interslot frequency hopping'. If the field is absent, frequency hopping is not configured.
frequencyHoppingOffset
Enables intra-slot frequency hopping with the given frequency hopping offset. Frequency hopping offset used when requency hopping is enabled. Corresponds to L1 parameter 'Frequency-hopping-offset' (see TS 38.214, section 6.1.2).
mcs-Table
Indicates the MCS table the UE shall use for PUSCH without transform precoding. If the field is absent the UE applies the value 64QAM.
mcs-TableTransformPrecoder
Indicates the MCS table the UE shall use for PUSCH with transform precoding. If the field is absent the UE applies the value 64QAM.
mcsAndTBS
The modulation order, target code rate and TB size (see TS38.214, section 6.1.2). The NW does not configure the values 28~31 in this version of the specification.
nrofHARQ-Processes
The number of HARQ processes configured. It applies for both Type 1 and Type 2. See TS 38.321, section 5.4.1.
p0-PUSCH-Alpha
Index of the P0-PUSCH-AlphaSet to be used for this configuration.
periodicity
Periodicity for UL transmission without UL grant for type 1 and type 2. Corresponds to L1 parameter 'UL-TWG-periodicity' (see TS 38.321, section 5.8.2).
The following periodicities are supported depending on the configured subcarrier spacing [symbols]:
15 kHz: 2, 7, n*14, where n = {1, 2, 4, 5, 8, 10, 16, 20, 32, 40, 64, 80, 128, 160, 320, 640}
30 kHz: 2, 7, n*14, where n = {1, 2, 4, 5, 8, 10, 16, 20, 32, 40, 64, 80, 128, 160, 256, 320, 640, 1280}
60 kHz with normal CP: 2, 7, n*14, where n = {1, 2, 4, 5, 8, 10, 16, 20, 32, 40, 64, 80, 128, 160, 256, 320, 512, 640, 1280, 2560}
60 kHz with ECP: 2, 6, n*12, where n = {1, 2, 4, 5, 8, 10, 16, 20, 32, 40, 64, 80, 128, 160, 256, 320, 512, 640, 1280, 2560}
120 kHz: 2, 7, n*14, where n = {1, 2, 4, 5, 8, 10, 16, 20, 32, 40, 64, 80, 128, 160, 256, 320, 512, 640, 1024, 1280, 2560, 5120}
(see 38.214, Table 6.1.2.3-1)
powerControlLoopToUse
Closed control loop to apply. Corresponds to L1 parameter 'PUSCH-closed-loop-index' (see TS 38.213, section 7.7.1).
rbg-Size
Selection between configuration 1 and configuration 2 for RBG size for PUSCH. When the field is absent the UE applies the value config1. The NW may only set the field to config2 if resourceAllocation is set to resourceAllocationType0 or dynamicSwitch. Note: rbg-Size is used when the transformPrecoder parameter is disabled.
repK-RV
The redundancy version (RV) sequence to use. See TS 38.214, section 6.1.2. The network configures this field if repetitions are used, i.e., if repK is set to n2, n4 or n8. Otherwise, the field is absent.
repK
The number or repetitions of K.
resourceAllocation
Configuration of resource allocation type 0 and resource allocation type 1. For Type 1 UL data transmission without grant, "resourceAllocation" should be resourceAllocationType0 or resourceAllocationType1.
rrc-ConfiguredUplinkGrant
Configuration for "configured grant" transmission with fully RRC-configured UL grant (Type1). If this field is absent the UE uses UL grant configured by DCI addressed to CS-RNTI (Type2). Type 1 configured grant may be configured for UL or SUL, but not for both simultaneously.
srs-ResourceIndicator

| ConfiguredGrantConfig field descriptions |
|---|
| Indicates the SRS resource to be used.<br>timeDomainAllocation<br>Indicates a combination of start symbol and length and PUSCH mapping type, see TS 38.214, section 6.1.2 and TS 38.212, section 7.3.1.<br>timeDomainOffset<br>Offset related to SFN = 0, see TS 38.321, section 5.8.2.<br>transformPrecoder<br>Enables or disables transform precoding for type1 and type2. If the field is absent, the UE enables or disables transform precoding in accordance with the field msg3-transformPrecoder in RACH-ConfigCommon, see 38.214, section 6.1.3.<br>uci-OnPUSCH<br>Selection between and configuration of dynamic and semi-static beta-offset. For Type 1 UL data transmission without grant, uci-OnPUSCH should be set to semiStatic. |

As explained in TS 38.331, "[t]he IE PUSCH-Config is used to configure the UE specific PUSCH parameters applicable to a particular BWP." The PUSCH-Config IE as defined in TS 38.331 at section 6.3.2 is shown below:

```
-- ASN1START
-- TAG-PUSCH-CONFIG-START
PUSCH-Config ::=           SEQUENCE {
    dataScramblingIdentityPUSCH    INTEGER (0..1023)                                         OPTIONAL,  -- Need S
    txConfig                       ENUMERATED {codebook, nonCodebook}                        OPTIONAL,  -- Need S
    dmrs-UplinkForPUSCH-MappingTypeA        SetupRelease {DMRS-UplinkConfig }   OPTIONAL, -- Need M
    dmrs-UplinkForPUSCH-MappingTypeB        SetupRelease {DMRS-UplinkConfig }   OPTIONAL, -- Need M
    pusch-PowerControl             PUSCH-PowerControl                                        OPTIONAL,  -- Need M
    frequencyHopping               ENUMERATED {intraS lot, interS lot}                       OPTIONAL,  -- Need S
    frequencyHoppingOffsetLists         SEQUENCE (SIZE (1..4)) OF INTEGER (1.. maxNrofPhysicalResourceBlocks-1)    OPTIONAL, -- Need M
    resourceAllocation             ENUMERATED { resourceAllocationType0, resourceAllocationType1, dynamicSwitch},
    pusch-TimeDomainAllocationList         SetupRelease { PUSCH-TimeDomainResourceAllocationList }   OPTIONAL, -- Need M
    pusch-AggregationFactor        ENUMERATED { n2, n4, n8 }                                 OPTIONAL,  -- Need S
    mcs-Table                      ENUMERATED {qam256, qam64LowSE}                           OPTIONAL,  -- Need S
    mcs-TableTransformPrecoder         ENUMERATED {qam256, qam64LowSE}    OPTIONAL, -- Need S
    transformPrecoder              ENUMERATED {enabled, disabled}                            OPTIONAL,  -- Need S
    codebookSubset                 ENUMERATED {fullyAndPartialAndNonCoherent, partialAndNonCoherent,
                                   nonCoherent }                              OPTIONAL,  -- Cond codebookBased
    maxRank                        INTEGER (1..4)                             OPTIONAL,  -- Cond codebookBased
    rbg-Size                       ENUMERATED {config2}                                      OPTIONAL,  -- Need S
    uci-OnPUSCH                    SetupRelease {UCI-OnPUSCH}                                OPTIONAL, -- Need M
    tp-pi2BPSK                     ENUMERATED {enabled}                                      OPTIONAL,  -- Need S
    ...
}
UCI-OnPUSCH ::=          SEQUENCE {
    betaOffsets              CHOICE {
        dynamic              SEQUENCE (SIZE (4)) OF BetaOffsets,
        semiStatic           BetaOffsets
    }                        OPTIONAL, -- Need M
    scaling                  ENUMERATED {f0p5, f0p65, f0p8, f1 }
}
-- TAG-PUSCH-CONFIG-STOP
-- ASN1STOP
```

The descriptions for the fields (parameters) included in the PUSCH-Config IE are provided below:

PUSCH-Config field descriptions codebookSubset
Subset of PMIs addressed by TPMI, where PMIs are those supported by UEs with maximum coherence capabilities Corresponds to L1 parameter 'ULCodebookSubset' (see 38.211, section 6.3.1.5).
dataScramblingIdentityPUSCH
Identifier used to initalite data scrambling (c_init) for PUSCH. If the field is absent, the UE applies the physical cell ID. (see 38.211, section 6.3.1.1).
dmrs-UplinkForPUSCH-MappingTypeA
DMRS configuration for PUSCH transmissions using PUSCH mapping type A (chosen dynamically via PUSCH-TimeDomainResourceAllocation). Only the fields dmrs-Type, dmrs-AdditionalPosition and maxLength may be set differently for mapping type A and B.
dmrs-UplinkForPUSCH-MappingTypeB
DMRS configuration for PUSCH transmissions using PUSCH mapping type B (chosen dynamically via PUSCH-TimeDomainResourceAllocation).Only the fields dmrs-Type, dmrs-AdditionalPosition and maxLength may be set differently for mapping type A and B.
frequencyHopping
The value intraSlot enables 'Intra-slot frequency hopping' and the value interSlot enables 'Interslot frequency hopping'. If the field is absent, frequency hopping is not configured. Corresponds to L1 parameter 'Frequency-hopping-PUSCH' (see 38.214, section 6).
frequencyHoppingOffsetLists
Set of frequency hopping offsets used when frequency hopping is enabled for granted transmission (not msg3) and type 2 Corresponds to L1 parameter 'Frequency-hopping-offsets-set' (see 38.214, section 6.3).
maxRank
Subset of PMIs addressed by TRIs from 1 to ULmaxRank. Corresponds to L1 parameter 'ULmaxRank' (see 38.211, section 6.3.1.5).
mcs-Table
Indicates which MCS table the UE shall use for PUSCH without transform precoder (see 38.214, section 6.1.4.1). If the field is absent the UE applies the value 64QAM
mcs-TableTransformPrecoder
Indicates which MCS table the UE shall use for PUSCH with transform precoding (see 38.214, section 6.1.4.1) If the field is absent the UE applies the value 64QAM
pusch-AggregationFactor
Number of repetitions for data. Corresponds to L1 parameter 'aggregation-factor-UL' (see 38.214, section FFS_Section). If the field is absent the UE applies the value 1.
pusch-TimeDomainAllocationList
List of time domain allocations for timing of UL assignment to UL data. If configured, the values provided herein override the values received in corresponding PUSCH-ConfigCommon for PDCCH scrambled with C-RNTI or CS-RNTI but not for CORESET#0 (see 38.214, table 6.1.2.1.1-1).
rbg-Size
Selection between configuration 1 and configuration 2 for RBG size for PUSCH. When the field is absent the UE applies the value config1. The NW may only set the field to config2 if resourceAllocation is set to resourceAllocationType0 or dynamicSwitch. Corresponds to L1 parameter 'RBG-size-PUSCH' (see 38.214, section 6.1.2.2.1).
resourceAllocation
Configuration of resource allocation type 0 and resource allocation type 1 for non-fallback DCI Corresponds to L1 parameter 'Resouce-allocation-config' (see 38.214, section 6.1.2).
tp-pi2BPSK
Enables pi/2-BPSK modulation with transform precoding if the field is present and disables it otherwise.
transformPrecoder
The UE specific selection of transformer precoder for PUSCH. When the field is absent the UE applies the value msg3-tp. Corresponds to L1 parameter 'PUSCH-tp' (see 38.211, section 6.3.1.4).
txConfig
Whether UE uses codebook based or non-codebook based transmission. Corresponds to L1 parameter 'ulTxConfig' (see 38.214, section 6.1.1). If the field is absent, the UE transmits PUSCH on one antenna port, see 38.214, section 6.1.1.

UCI-OnPUSCH field descriptions beta Offsets
Selection between and configuration of dynamic and semi-static beta-offset. If the field is absent or released, the UE applies the value 'semiStatic' and the BetaOffsets according to FFS [BetaOffsets and/or section 9.x.x). Corresponds to L1 parameter 'UCI-on-PUSCH' (see 38.213, section 9.3).
scaling
Indicates a scaling factor to limit the number of resource elements assigned to UCI on PUSCH. Value f0p5 corresponds to 0.5, value f0p65 corresponds to 0.65, and so on. The value configured herein is applicable for PUCCH with configured grant. Corresponds to L1 parameter 'uci-on- pusch-scaling' (see 38.212, section 6.3).

| Conditional Presence | Explanation |
|---|---|
| codebookBased | The field is mandatory present if txConfig is set to codebook and absent otherwise. |

2. Transmission Schemes

3GPP TS 38.214 section 6.1.1 states, "two transmission schemes are supported for PUSCH: codebook based transmission and non-codebook based transmission. The UE is configured with codebook based transmission when the higher layer parameter txConfig in PUSCH-Config is set to 'codebook', the UE is configured non-codebook based transmission when the higher layer parameter txConfig is set to 'nonCodebook'. If the higher layer parameter txConfig is not configured, the UE is not expected to be scheduled by DCI format 0_1."

3. Configured Grant Transmission and Retransmission

3GPP 38.321 states,

TABLE 10.2-1

Special fields for DL SPS and UL grant Type 2 scheduling activation PDCCH validation

| | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

1>else if an uplink grant for this PDCCH occasion has been received for this Serving Cell on the PDCCH for the MAC entity's CS-RNTI:
  2>if the NDI in the received HARQ information is 1:
    3>consider the NDI for the corresponding HARQ process not to have been toggled;
    3>start or restart the configuredGrantTimer for the corresponding HARQ process, if configured;
    3>deliver the uplink grant and the associated HARQ information to the HARQ entity.
  2>else if the NDI in the received HARQ information is 0:
    3>if PDCCH contents indicate configured grant Type 2 deactivation:
      4>trigger configured uplink grant confirmation.
    3>else if PDCCH contents indicate configured grant Type 2 activation:
      4>trigger configured uplink grant confirmation;
      4>store the uplink grant for this Serving Cell and the associated HARQ information as configured uplink grant;
      4>initialise or re-initialise the configured uplink grant for this Serving Cell to start in the associated PUSCH duration and to recur according to rules in subclause 5.8.2;
      4>set the HARQ Process ID to the HARQ Process ID associated with this PUSCH duration;
      4>consider the NDI bit for the corresponding HARQ process to have been toggled;
      4>stop the configuredGrantTimer for the corresponding HARQ process, if running;
      4>deliver the configured uplink grant and the associated HARQ information to the HARQ entity.

4. Validation of Activation and Deactivation for Configured Grant(38.213)

A version of 3GPP 38.213 states:

10.2 PDCCH validation for DL SPS and UL grant Type 2

A UE validates, for scheduling activation or scheduling release, a DL SPS assignment PDCCH or configured UL grant Type 2 PDCCH if the CRC of a corresponding DCI format is scrambled with a CS-RNTI provided by higher layer parameter cs-RNTI, and the new data indicator field for the enabled transport block is set to '0'.

Validation of the DCI format is achieved if all fields for the DCI format are set according to Table 10.2-1 or Table 10.2-2.

If validation is achieved, the UE considers the information in the DCI format as a valid activation or valid release of DL SPS or configured UL grant Type 2. If validation is not achieved, the UE considers the DCI format as having been detected with a non-matching CRC.

TABLE 10.2-2

Special fields for DL SPS and UL grant Type 2 scheduling release PDCCH validation

| | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

A UE is expected to provide HARQ-ACK information in response to a SPS PDSCH release after N symbols from the last symbol of a PDCCH providing the SPS PDSCH release. For UE processing capability 1 [6, TS 36.214] and for the subcarrier spacing of the PDCCH reception, N=10 for 15 kHz, N=12 for 30 kHz, N=22 for 60 kHz, and N=25 for 120 kHz. For a UE with capability 2 [6, TS 36.214] in frequency range 1 and for the subcarrier spacing of the PDCCH reception, N=5 for 15 kHz, N=5.5 for 30 kHz, and N=11 for 60 kHz.

5. DCI 0_1 in USS

The content of DCI 0_1 and DCI 1_1 depends on the Information Element the DCI is associated with. One example is, if the frequency hopping is enabled for PUSCH-Config, but disabled for ConfigureGrantConfig; the bit field for frequency hopping is 1 bit when DCI applies to PUSCH-Config, 0 bit when DCI applies to ConfigureGrantConfig.

6. Procedure in 38.321 for Determination of Retransmission, Activation and Deactivation/Release.

3GPP TS 38.321 5.4.1 states:

```
1>else if an uplink grant for this PDCCH occasion has been received for this Serving Cell on
   the PDCCH for the MAC entity's CS-RNTI:
  2>if the NDI in the received HARQ information is 1:
    3>consider the NDI for the corresponding HARQ process not to have been toggled;
    3>start or restart the configuredGrantTimer for the corresponding HARQ process, if
       configured;
    3>deliver the uplink grant and the associated HARQ information to the HARQ entity.
  2>else if the NDI in the received HARQ information is 0:
    3>if PDCCH contents indicate configured grant Type 2 deactivation:
      4>trigger configured uplink grant confirmation.
    3>else if PDCCH contents indicate configured grant Type 2 activation:
      4>trigger configured uplink grant confirmation;
      4>store the uplink grant for this Serving Cell and the associated HARQ information
         as configured uplink grant;
      4>initialise or re-initialise the configured uplink grant for this Serving Cell to start in
         the associated PUSCH duration and to recur according to rules in subclause 5.8.2;
      4>set the HARQ Process ID to the HARQ Process ID associated with this PUSCH
         duration;
      4>consider the NDI bit for the corresponding HARQ process to have been toggled;
      4>stop the configuredGrantTimer for the corresponding HARQ process, if running;
      4>deliver the configured uplink grant and the associated HARQ information to the
         HARQ entity.
```

SUMMARY

There currently exist certain challenge(s).

One challenge relates to missing and unclear RRC configuration for ConfigurationGrant. Several RRC parameters, such as, for example, txConifg, maxRank, and codebook-Subset are only configured in PUSCH-Config. Hence, It is unclear how the type 2 configured grant PUSCH transmission can get configured with multiple layers.

The retransmission of uplink configured grant is not clearly specified in 3GPP. Whether the retransmission DCI shall apply the IE for dynamic PUSCH that is PUSCH-Config, or ConfiguredGrantConfig, or a mix of them is not clear.

Another challenge relates to an ambiguity of DCI for activation and retransmission, as illustrated below.

At the time a user equipment (UE) has received an activation, for the next received PDCCH that is scrambled with a CS-RNTI allocated to the UE, the PDCCH (DCI 0_1 message) can be possibly configured for activation or retransmission. The DCI format that used to construct the DCI message, how many bits shall be used for a field follows the RRC configuration that is associated with the message. If the retransmission applies the PUSCH-Config configuration, and if the PUSCH-Config configuration is different from the ConfiguredGrantConfig configuration, there's ambiguity issue of DCI if the same DCI fields are of different sizes because of the difference in the configurations.

The DCI bit field of NDI in the activate signal can be in a different location than for a retransmission signal. This is illustrated in FIG. 17, which shows the DCI when the frequency hopping is enabled in dynamic grant but disabled for configured grant.

As shown in FIG. 17, the NDI bit in the DCI 0_1 message associated with the ConfiguredGrantConfig IE is not located in the same position as the NDI bit in the DCI 0_1 message associated with the PUSCH-Config IE.

The ambiguity illustrated in FIG. 17 can only occur if the DCI is of DCI format 0_1, which is the normal DCI for scheduling PUSCH. This is because the length of FDRA, FH and TDRA fields can vary according to configuration, and these fields are ahead of the NDI field in DCI format 0_1 message.

With the existing procedure in 38.321, the UE considers the received PDCCH (e.g., DCI 0_1 message) is a retransmission if the NDI bit is set to a value of 1, and considers the received PDCCH is activation if the NDI bit is set to a value of 0.

Consider the following scenarios:

Scenario 1:

The network sends a retransmission PDCCH (DCI 0_1 message) to UE to indicate retransmission of a transport block (TB) of UL configured grant, where the CRC is scrambled by CS-RNTI. By coincidence, the DCI 0_1 content matches both 1) a valid retransmission grant and 2) a valid activation command. This is possible since the position of the NDI field might be different for activation commands and for retransmission grants as illustrated above. If the UE first tries to interpret the DCI content as an activation command it will find a valid command and might not check for a retransmission grant.

Scenario 2:

The network sends an activation to the UE, and, by coincidence, the DCI 0_1 message matches both a valid retransmission grant and a valid activation command. This is possible since the position of the NDI field might be different for activation commands and for retransmission grants. If the UE tries to interpret the DCI content as a retransmission grant it will find a valid retransmission grant and might not interpret the DCI content as an activation command (which is sometimes also referred to as an activation grant).

Scenario 3

The network sends a retransmission PDCCH to UE to indicate retransmission of a TB of UL configured grant, where the CRC is scrambled by CS-RNTI. If the UE tries to interpret the DCI content as an activation command based on the value of the bit in the position where the NDI would be in an activation command but the rest of the DCI content does not match an activation command the UE might interpret the DCI contents as inconsistent and not check for a retransmission grant.

Certain aspects of the present disclosure and their embodiments may provide solutions to these or other challenges.

With respect to the first mentioned challenge, the RRC parameters txConfig, maxRank and codebookSubset that are related to multi-antenna and multiple layer transmission may be added to ConfiguredGrantConfig IE or the UE should simply use the values for these parameters as indicated in the PUSCH-config configuration. The configured grant can use DCI 0_1 for activation. In other words, the configuration in higher layer (RRC) shall support multiple layers transmission for configured grant by having the UE use the values of txConfig, maxRank and codebookSubset from the PUSCH-Config configuration or by adding txConfig, maxRank and codebookSubset to ConfiguredGrantConfig and having the UE use these values. The txConfig, maxRank and codebookSubset values included in the ConfiguredGrantConfig IE may be different than the txConfig, maxRank and codebookSubset values included in the PUSCH-Config IE.

With respect to the second mentioned challenge (DCI 0_1 message ambiguity), the UE can perform a decoding procedure, as described herein, to resolve the ambiguity.

For example, the UE performs detection of PDCCH and handles possible ambiguity of the signaling, the signal that has a stronger support for validation shall be assumed to have higher priority than the other signals. For example, for configured grant, the UE performs detection of Activation first, and if the validation of the signal fails, the UE performs detection of Retransmission signal. Another approach is for the UE to prioritize the results from Activation detection than Retransmission detection. From the network node, when the base station (gNb) sends PDCCH (DCI 0_1 message) to UE, the gNB shall try to avoid the combination that could cause a false detection at the UE side. For configured grant, the gNb can either avoid different NDI field position for Activation and Retransmission. Or avoid the false detection by taking care of the value in DCI field that used as indicator or validation.

There are, proposed herein, various embodiments which address one or more of the issues disclosed herein.

Wireless Device (WD) Embodiments

In one embodiment, a first method is performed by a wireless device, and the first method includes performing PDCCH reception assuming the PDCCH (e.g., a received PDCCH scrambled with CS-RNTI) is for activation and determining whether the content of the PDCCH matches (or indicates) an activation command. The method may also include, as a result of determining that the content of the PDCCH matches (or indicates) an activation command, checking a particular field in the PDCCH (e.g., the bit that is in the position of the NDI'field for a activation command) to determine whether the field (e.g., bit) is set to a value of 0. The method may also include, as a result of determining that that the field is 0, treating the PDCCH as an activation command.

In some embodiments, the method may also include determining whether the content of the PDCCH indicates configured grant Type 2 activation; and, optionally, as a result of determining that the content of the PDCCH indicates configured grant Type 2 activation, triggering configured uplink grant confirmation.

In some embodiments, the method may also include, as a result of determining that the content of the PDCCH s indicates configured grant Type 2 activation, storing an uplink grant and associated HARQ information as configured uplink grant and, optionally, initialising or re-initialising the configured uplink grant for the Serving Cell to start in an associated PUSCH duration and, optionally, to recur according to rules.

In another embodiment a second method is performed by a wireless device, and the second method includes the wireless device successfully decoding a PDCCH as a retransmission grant; the wireless device successfully decoding the PDCCH as an activation command; and the wireless device choosing based on priority whether to treat the PDCCH as a retransmission grant or as an activation command.

In some embodiments, the first method and the second method may also include providing user data; and forwarding the user data to a host computer via a transmission to the base station.

In another embodiment, a third method is performed by the wireless device, and the third method includes the WD receiving a ConfiguredGrantConfig information element, IE, transmitted by a base station, wherein the ConfiguredGrantConfig IE includes at least one of the following RRC parameters: txConfig, maxRank, or codebookSubset.

In another embodiment a fourth method is performed by the wireless device (WD). The fourth method includes the WD the WD receiving a PUSCH-Config information element, IE, from a base station, wherein the PUSCH-Config IE includes a first set of PUSCH configuration parameters, wherein the first set of PUSCH configuration parameters includes at least one of the following: txConfig, maxRank, or codebookSubset. The WD then transmits data on a Physical Uplink Shared Channel (PUSCH) corresponding to a configured grant using the first set of PUSCH configuration parameters. In some embodiments, the method further includes the WD receiving a ConfiguredGrantConfig IE from a base station. In such an embodiment the method may further include the WD also using a second set of PUSCH configuration parameters according to the ConfiguredGrantConfig IE to transmit the data on the PUSCH. In some embodiments, the PUSCH is associated with a CS-RNTI. In some embodiments, the PUSCH is associated with a type 1 configured grant transmission. In some embodiments, the PUSCH is associated with a type 2 configured grant transmission. In some embodiments, receiving the PUSCH-Config IE comprises the WD receiving a BWP-UplinkDedicated IE, which is used to configure dedicated parameters of an uplink Bandwidth Part, BWP, wherein the BWP-UplinkDedicated IE includes the PUSCH-Config IE. In some embodiments, the BWP-UplinkDedicated IE further includes a ConfiguredGrantConfig IE.

Base Station Embodiments

In one embodiment, a first method is performed by a base station, and the first method includes the base station deciding to configure a WD for uplink transmission without dynamic grant. The method may also include, as a result of deciding to configure the WD for uplink transmission without dynamic grant, the base station generating a ConfiguredGrantConfig wherein, optionally, the ConfiguredGrantConfig IE includes one or more of the following RRC parameters txConfig, maxRank and codebookSubset. The method may also include the base station transmitting the ConfiguredGrantConfig IE to the WD.

In some embodiments, transmitting the ConfiguredGrantConfig IE comprises at least one of the base station generating a BWP-UplinkDedicated IE, which, optionally, is used to configure the dedicated (WD specific) parameters of an uplink Bandwidth Part (BWP); and the base station transmitting to the WD the BWP-UplinkDedicated IE which, optionally, includes the generated ConfiguredGrantConfig IE.

In some embodiments, the BWP-UplinkDedicated IE further includes a PUSCH-Config IE that contains parameter values for the one or more of RRC parameters txConfig, maxRank and codebookSubset.

In some embodiments, the parameter values for the RRC parameters txConfig, maxRank and codebookSubset included in the PUSCH-Config IE are different than the parameter values for the RRC parameters txConfig, maxRank and codebookSubset included in the ConfiguredGrantconfig IE.

In one embodiment, a second method is performed by a base station, and the second method includes the base station deciding to transmit to a WD a DCI configured for a retransmission grant. The method may also include the base station ensuring that if a WD decodes the DCI configured for the retransmission grant under the assumption that the DCI is an activation command the WD will not determine that the DCI is a valid activation command. The method may also include the base station transmitting the DCI.

In some embodiments, the first method and the second method may also include the base station obtaining user data and forwarding the user data to a host computer or a wireless device.

In one embodiment, a third method is performed by a base station, and the third method includes the base station transmitting to a WD a PUSCH-Config IE, wherein the PUSCH-Config IE includes a first set of PUSCH configuration parameters, wherein the first set of PUSCH configuration parameters includes at least one of the following: txConfig, maxRank, or codebookSubset. The method also includes the base station instructing or configuring the WD to perform a configured grant (CG) transmission on the PUSCH using the first set of parameters.

In some embodiments, the method also includes the base station transmitting to the WD a ConfiguredGrantConfig IE. In some embodiments, the base station instructs or configures the WD to use a second set of PUSCH configuration parameters according to the ConfiguredGrantConfig IE to perform the CG transmission on the PUSCH.

In some embodiments, the PUSCH transmission is associated with a CS-RNTI. In some embodiments, the PUSCH transmission is associated with a type 1 configured grant transmission. In other embodiments, the PUSCH transmission is associated with a type 2 configured grant transmission.

In some embodiments, transmitting the PUSCH-Config IE comprises the base station transmitting a BWP-UplinkDedicated IE, which is used to configure dedicated parameters of an uplink Bandwidth Part, BWP, wherein the BWP-UplinkDedicated IE includes the PUSCH-Config IE. In some embodiments, the BWP-UplinkDedicated IE further includes a ConfiguredGrantConfig IE.

In some embodiments the method also includes the base station using the first set of parameters to detect the configured grant transmission performed by the WD.

Certain embodiments may provide one or more of the following technical advantage, including higher spectrum efficiency and low latency are achieved with supporting multiple layer transmissions for Configured Grant apply higher layer configurations and DCI format 0_1. Also, with WD performing activation detection first or with higher priority, the false detection of retransmission can be reduced significantly, thereby improving performance by decreasing latency and increasing spectrum efficiency, which can lead to higher data rates and longer battery life. With gNB implementation effort, the false detection because of the ambiguity of the signals can be avoided.

BRIEF DESCRIPTION OF THE DRAWINGS

FIG. 17 shows DCIs according to an embodiment.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the Appendix.

I. Adding or reusing existing RRC parameter to support DCI 0_1 and multiple layer transmission for configured grant.

In one embodiment, RRC parameters such as txConfig, maxRank and codebookSubset are added to the ConfiguredGrantConfig IE. Adding these RRC parameters to the ConfiguredGrantConfig IE allows the values of these parameters to be specifically defined for the configured grant process, without being aligned with parameter values in PUSCH-Config, which is used for dynamically scheduled PUSCH (i.e., not according to configured grant)

Figure 4A:
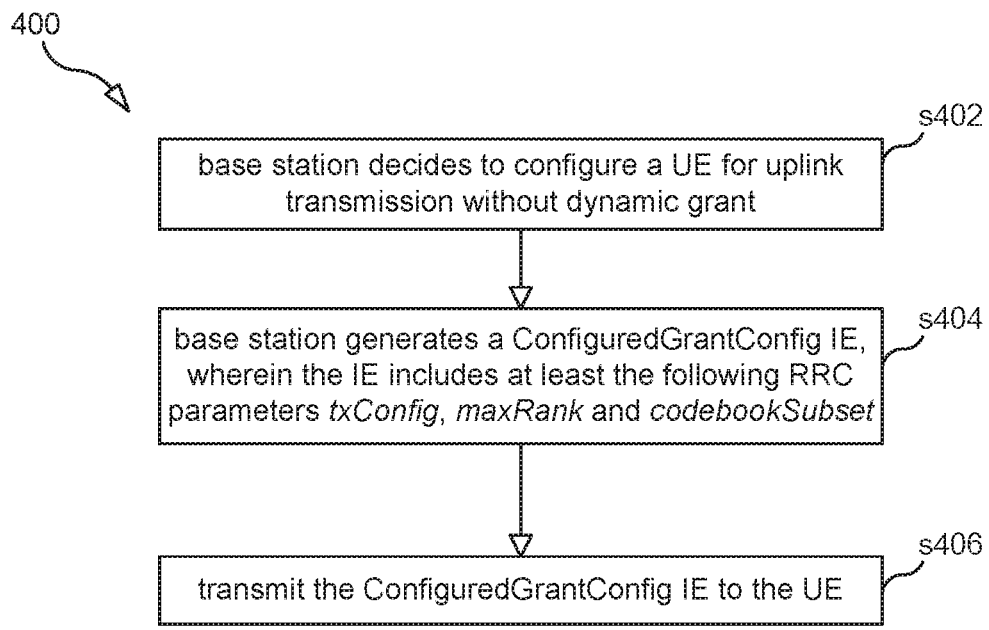
FIG. 4A is a flowchart illustrating a process according to an embodiment.

In this embodiment, a base station (e.g., gNB) may perform process 400 (see FIG. 4A), which may begin in step s402. In step s402, the base station decides to configure a UE for uplink transmission without dynamic grant. As a result, the base station generates a ConfiguredGrantConfig IE, wherein the IE includes at least the following RRC parameters txConfig, maxRank and codebookSubset (step s404).

Figure 4B:
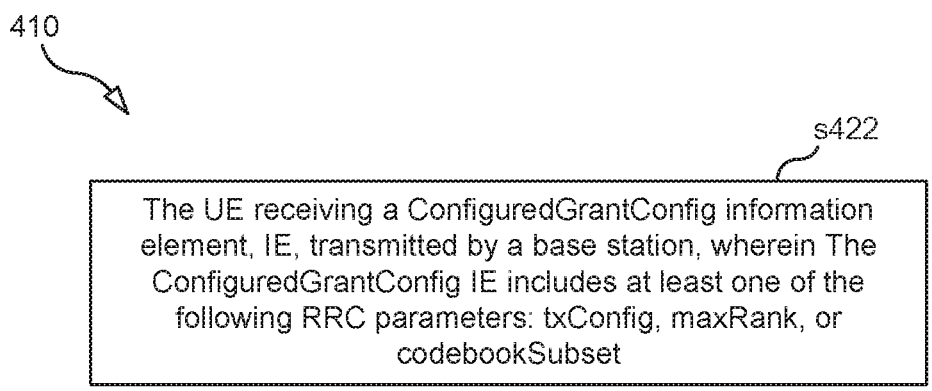
FIG. 4B is a flowchart illustrating a process according to an embodiment.

In step s406, the base station transmits the ConfiguredGrantConfig IE to the UE, which then receives the ConfiguredGrantConfig IE (see step s422 of process 410 shown in FIG. 4B). For example, in step s406, the base station: 1) generates a BWP-UplinkDedicated IE, which is used to configure the dedicated (UE specific) parameters of an uplink Bandwidth Part (BWP), and 2) transmits to the UE the BWP-UplinkDedicated IE which includes the generated ConfiguredGrantConfig IE. The BWP-UplinkDedicated IE may also include a PUSCH-Config IE that also contains parameter values for the RRC parameters txConfig, maxRank and codebookSubset. The parameter values for the RRC parameters txConfig, maxRank and codebookSubset included in the PUSCH-Config IE may be different than the parameter values for the RRC parameters txConfig, maxRank and codebookSubset included in the ConfiguredGrantconfig IE.

The table belows shows the ConfiguredGrantconfig IE with the RRC parameters txConfig, maxRank and codebookSubset included:

```
ASN1START
-- TAG-CONFIGUREDGRANTCONFIG-START
ConfiguredGrantConfig ::=       SEQUENCE {
    frequencyHopping            ENUMERATED {intraSlot, interSlot}                OPTIONAL,  --
Need S,
    cg-DMRS -Configuration      DMRS-UplinkConfig,
    mcs-Table                   ENUMERATED {qam256, qam64LowSE}                  OPTIONAL,  -- Need S
    mcs-TableTransformPrecoder  ENUMERATED {qam256, qam64LowSE }                 OPTIONAL,
-- Need S
    uci-OnPUSCH                 SetupRelease { CG-UCI-OnPUSCH }                  OPTIONAL,  --
Need M
    resourceAllocation          ENUMERATED { resourceAllocationType0, resourceAllocationType1,
dynamicSwitch },
    rbg-Size                    ENUMERATED {config2}                             OPTIONAL,  -- Need S
    powerControlLoopToUse       ENUMERATED {n0, n1},
    p0-PUS CH-Alpha             P0-PUSCH-AlphaSetId,
    transformPrecoder           ENUMERATED {enabled, disabled}                   OPTIONAL,  --
Need S
    txConfig                    ENUMERATED {codebook, nonCodebook}               OPTIONAL,  -- Need S
    codebookSubset              ENUMERATED {fullyAndPartialAndNonCoherent, partialAndNonCoherent,
nonCoherent}                    OPTIONAL, -- Cond codebookBased
    maxRank                     INTEGER (1..4)                                   OPTIONAL,  -- Cond codebookBased
    nrofHARQ-Processes          INTEGER(1..16),
    repK                        ENUMERATED {n1, n2, n4, n8},
    repK-RV                     ENUMERATED {s1-0231, s2-0303, s3-0000}           OPTIONAL,  -- Need R
    periodicity                 ENUMERATED {
sym2, sym7, sym1x14, sym2x14, sym4x14, sym5x14, sym8x14, sym10x14, sym16x14, sym20x14, sym32x14,
sym40x14, sym64x14, sym80x14, sym128x14, sym160x14, sym256x14, sym320x14, sym512x14, sym640x14,
sym1024x14, sym1280x14, sym2560x14, sym5120x14, sym6, sym1x12, sym2x12, sym4x12, sym5x12, sym8x12,
sym10x12, sym16x12, sym20x12, sym32x12, sym40x12, sym64x12, sym80x12, sym128x12, sym160x12,
sym256x12, sym320x12, sym512x12, sym640x12, sym1280x12, sym2560x12
    },
    configuredGrantTimer        INTEGER (1..64)                                  OPTIONAL,  -- Need R
    rrc-ConfiguredUplinkGrant       SEQUENCE {
        timeDomainOffset            INTEGER (0..5119),
        timeDomainAllocation        INTEGER (0..15),
        frequencyDomainAllocation   BIT STRING (SIZE(18)),
        antennaPort                 INTEGER (0..31),
        dmrs-SeqInitialization      INTEGER (0..1)                               OPTIONAL,  -- Need R
        precodingAndNumberOfLayers  INTEGER (0..63),
        srs-ResourceIndicator       INTEGER (0..15)                              OPTIONAL,  -- Need R
        mcsAndTBS                   INTEGER (0..31),
        frequencyHoppingOffset      INTEGER (1.. maxNrofPhysicalResourceBlocks-1)    OPTIONAL,  --
Need R
        pathlossReferenceIndex      INTEGER (0..maxNrofPUSCH-Pathloss-
                                    ReferenceRSs-1),
        ...
    }                                                                            OPTIONAL,  -- Need R
    ...
}
CG-UCI-OnPUSCH ::= CHOICE {
    dynamic                     SEQUENCE (SIZE (1..4)) OF BetaOffsets,
    semiStatic                  BetaOffsets
}
-- TAG-CONFIGUREDGRANTCONFIG-STOP
-- ASN1 STOP
```

In another embodiment, for configured grant, instead of including the missing RRC parameter in Configuredgrant-Config, the UE uses txConfig, maxRank and codebookSubset parameter values contained in the PUSCH-config configuration. Using this approach both PUSCH according to configured grant and PUSCH according to dynamic scheduling share the same parameter values.

Figure 16A:
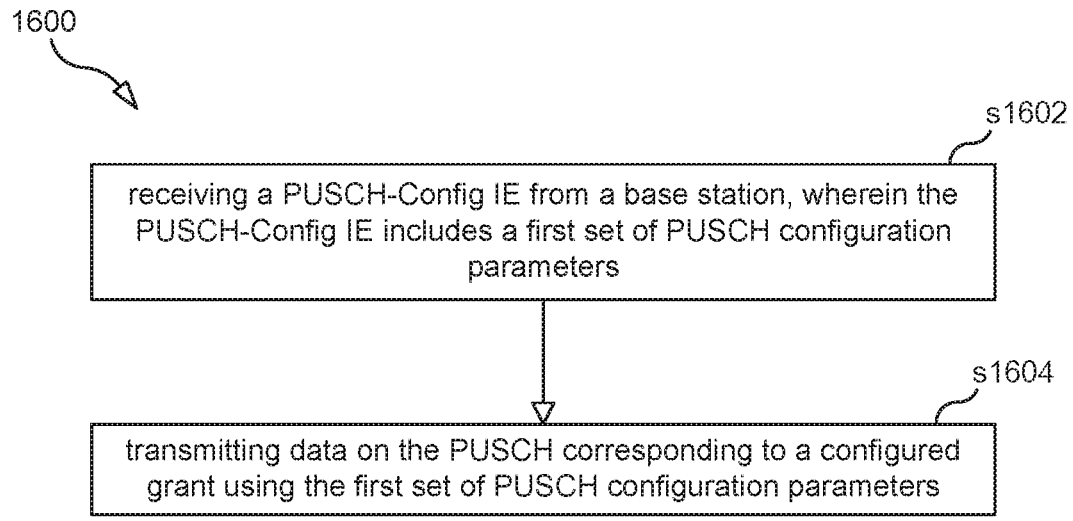
FIG. 16A is a flow chart illustrating a process according to an embodiment.
Figure 16B:
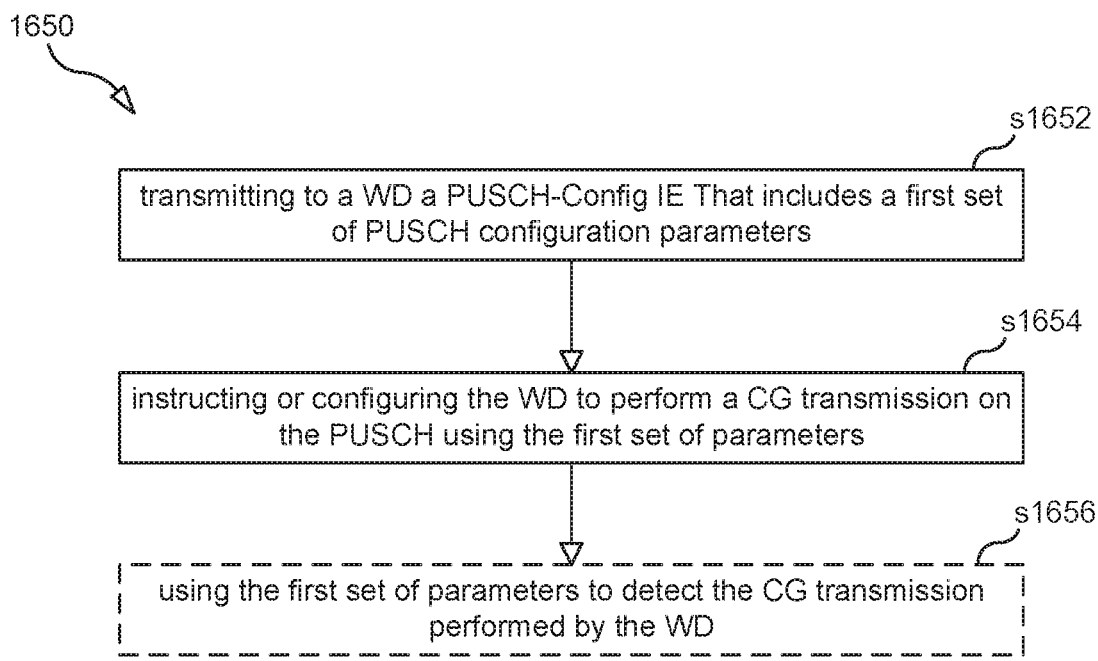
FIG. 16B is a flow chart illustrating a process according to an embodiment.

Accordingly, in one aspect there is provided a process 1600 (see FIG. 16A) performed by a WD and a process 1650 (see FIG. 16B) performed by a base station.

Process 1600 performed by the WD includes: (1) the WD receiving a PUSCH-Config information element, IE, from a base station (step s1602), wherein the PUSCH-Config IE includes a first set of PUSCH configuration parameters, wherein the first set of PUSCH configuration parameters includes at least one of the following: txConfig, maxRank, or codebookSubset; and (2) the WD performing a transmission of data on the PUSCH wherein the transmission corresponds to a configured grant using the first set of PUSCH configuration parameters (step s1604). In some embodiments, the process 1600 further includes the WD receiving a ConfiguredGrantConfig IE from a base station. In such an embodiment the process 1600 may further include the WD also using a second set of PUSCH configuration parameters according to the ConfiguredGrantConfig IE to transmit the data on the PUSCH. In some embodiments, the PUSCH is associated with a CS-RNTI. In some embodiments, the PUSCH is associated with a type 1 configured grant transmission. In some embodiments, the PUSCH is associated with a type 2 configured grant transmission. In some embodiments, receiving the PUSCH-Config IE comprises the WD receiving a BWP-UplinkDedicated IE, which is used to configure dedicated parameters of an uplink Bandwidth Part, BWP, wherein the BWP-UplinkDedicated IE includes the PUSCH-Config IE. In some embodiments, the BWP-UplinkDedicated IE further includes a ConfiguredGrantConfig IE.

And the process 1650 performed by the base station includes: the base station transmitting to a WD a PUSCH-Config IE (step s1652), wherein the PUSCH-Config IE includes a first set of PUSCH configuration parameters, wherein the first set of PUSCH configuration parameters includes at least one of the following: txConfig, maxRank, or codebookSubset. The process 1650 also includes the base station instructing or configuring the WD to perform a configured grant (CG) transmission on the PUSCH using the first set of parameters (step s1654). In some embodiments, process 1650 also includes the base station using the first set of parameters to detect the CG transmission performed by the WD (step s1656). In some embodiments, the process 1650 also includes the base station transmitting to the WD a ConfiguredGrantConfig IE. In some embodiments, the base station instructs or configures the WD to use a second set of PUSCH configuration parameters according to the ConfiguredGrantConfig IE to perform the CG transmission on the PUSCH. In some embodiments, the PUSCH transmission is associated with a CS-RNTI. In some embodiments, the PUSCH transmission is associated with a type 1 configured grant transmission. In other embodiments, the PUSCH transmission is associated with a type 2 configured grant transmission. In some embodiments, transmitting the PUSCH-Config IE comprises the base station transmitting a BWP-UplinkDedicated IE, which is used to configure dedicated parameters of an uplink Bandwidth Part, BWP, wherein the BWP-UplinkDedicated IE includes the PUSCH-Config IE. In some embodiments, the BWP-UplinkDedicated IE further includes a ConfiguredGrantConfig IE.

The configured grant can use DCI 0_1 for activation, which DCI can have an ambiguity. DCI format 0_0, which is used for deactivation of UL configured grant, does not have the ambiguity problem because FDRA, TDRA and FH are fixed sized in DCI 0_0.

II. DCI Ambiguity

II.A. UE DCI Detection Effort

II.A.i. DCI Detection Order

If the UE is not expected to be scheduled with a retransmission grant using CRC scrambled by CS-RNTI with DCI content that matches an activation command no ambiguity exists.

Figure 1:
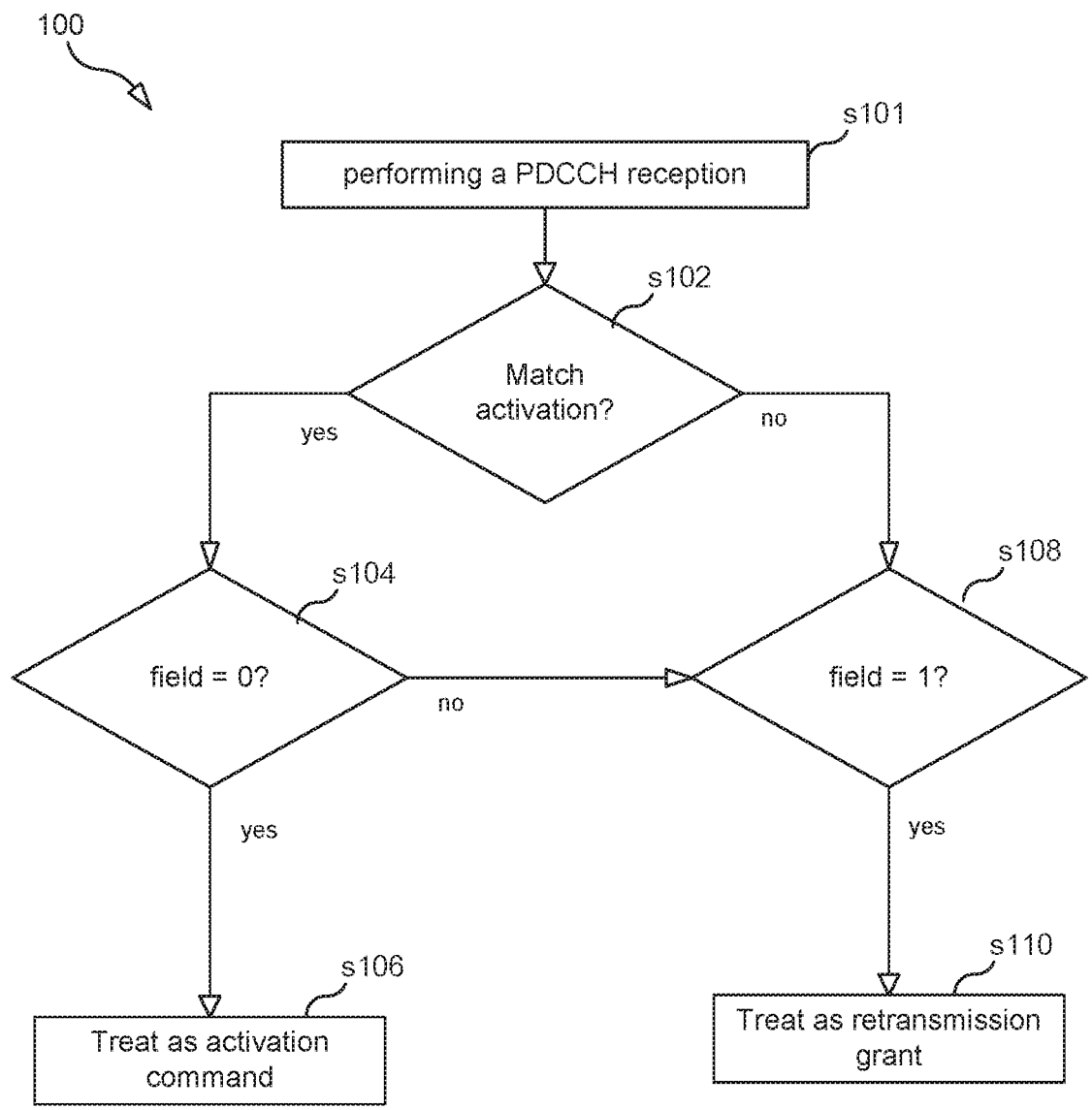
FIG. 1 is a flowchart illustrating a process according to an embodiment.

The following process 100 (see FIG. 1) can be implemented in the UE to ensure no ambiguity. Process 100 may begin with step s101.

Step s101 comprises the UE performing DCI (PDCCH) reception assuming the PDCCH is for activation.

In step s102, the UE then determines whether the content of the PDCCH matches an activation command. For example, as explained above, if the PDCCH is for activation, then the bits for HARQ process number and Redundancy version will be all zero. Thus, the UE can check these bits to determine whether the PDCCH matches an activation command. If the UE determines that the content of the PDCCH matches an activation command, then the UE performs step s104, otherwise it proceeds to step s108.

In step s104, the UE checks a particular field (e.g., particular bit) in the PDCCH (e.g., the bit that is in the position of the NDI field for an activation command) to determine whether the field is set to a value of 0. If the UE determines that the field is 0, then the UE performs step s106, otherwise performs step s108.

In step s106, as a result of determining that the field is 0, then the UE assumes that PDCCH is indeed for the corresponding purpose (i.e., activation), and not a PDCCH scheduling a retransmission. That is, the UE treats the PDCCH as an activation command.

In step s108, the UE checks a particular field in the PDCCH (e.g., the bit that is in the position of the NDI field for a retransmission grant) to determine whether the field is set to a value of 1. If the UE determines that the field is 1, then the UE performs step s110, otherwise the process ends and the UE may ignore the PDCCH. In step s110, as a result of determining that the bit is 1, the UE decodes the PDCCH as a retransmission grant.

In some embodiments, the UE skips step s108, i.e. the UE assumes that the PDCCH is a retransmission grant if it doesn't match an activation command and does not check the value of the bit in the position where the NDI field would be if the PDCCH content is a retransmission grant.

In one embodiment, the following change is made to TS 38.321

---

1> else if an uplink grant for this PDCCH occasion has been received for this Serving Cell on the PDCCH for the MAC entity's CS-RNTI:
  2> if the NDI bit follows activation or deactivation DCI in the received HARQ information is 0:
    3> if PDCCH contents indicate configured grant Type 2 deactivation:
      4> trigger configured uplink grant confirmation.

3> else if PDCCH contents indicate configured grant Type 2 activation:
  4> trigger configured uplink grant confirmation;
  4> store the uplink grant for this Serving Cell and the associated HARQ information as configured uplink grant;
  4> initialise or re-initialise the configured uplink grant for this Serving Cell to start in the associated PUSCH duration and to recur according to rules in subclause 5.8.2;
  4> set the HARQ Process ID to the HARQ Process ID associated with this PUSCH duration;
  4> consider the NDI bit for the corresponding HARQ process to have been toggled;
  4> stop the configuredGrantTimer for the corresponding HARQ process, if running;
  4> deliver the configured uplink grant and the associated HARQ information to the HARQ entity.
 3> else if the PDCCH content is not valid for activation or deactivation:
  4> if the NDI bit follows retransmission DCI in the received HARQ information is 1:
   5> consider the NDI for the corresponding HARQ process not to have been toggled;
   5> start or restart the configuredGrantTimer for the corresponding HARQ process, if configured;
   5> deliver the uplink grant and the associated HARQ information to the HARQ entity.

II.A.ii Detection Priority

Figure 2:
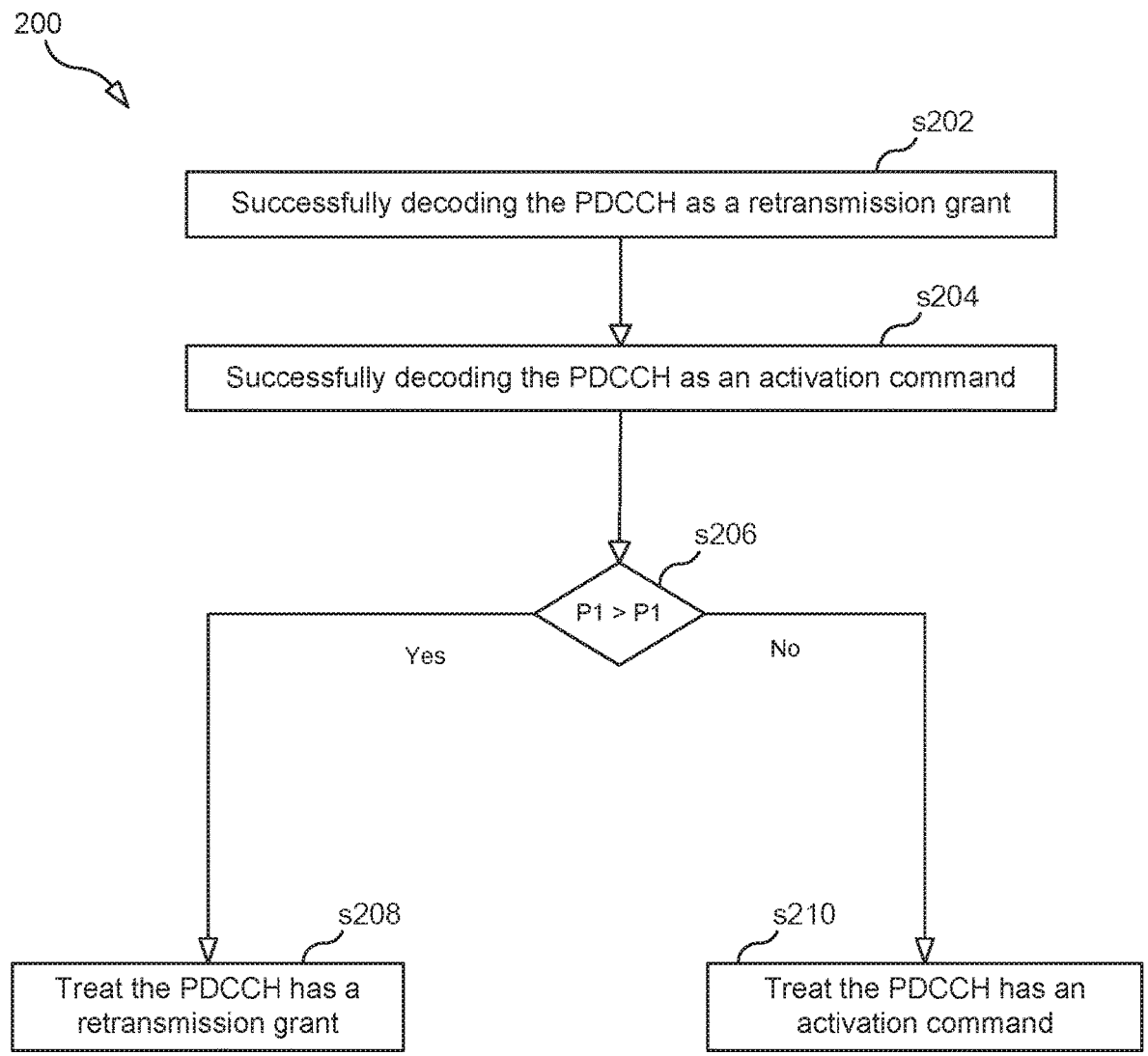
FIG. 2 is a flowchart illustrating a process according to an embodiment.

In this embodiment, shown in FIG. 2, the UE performs in parallel decoding of the PDCCH for both the activation command and the retransmission grant. For example, assuming that a) the UE successfully decoded the PDCCH as a retransmission grant (step s202) (i.e., decoding as retransmission grant has passed a CRC check and the NDI bit for retransmission grant is 1) and b) the UE successfully decoded the PDCCH as an activation command (step s204) (i.e., decoding as activation has passed a CRC check, the NDI field is 0, and the validation check is valid), then the UE can choose based on priority (step s206) whether to treat the PDCCH as a retransmission grant (step s208) or as an activation command (step s210). In FIG. 2, p1 represents the priority of retransmission grant and p2 represents the priority of activation command.

Figure 3:
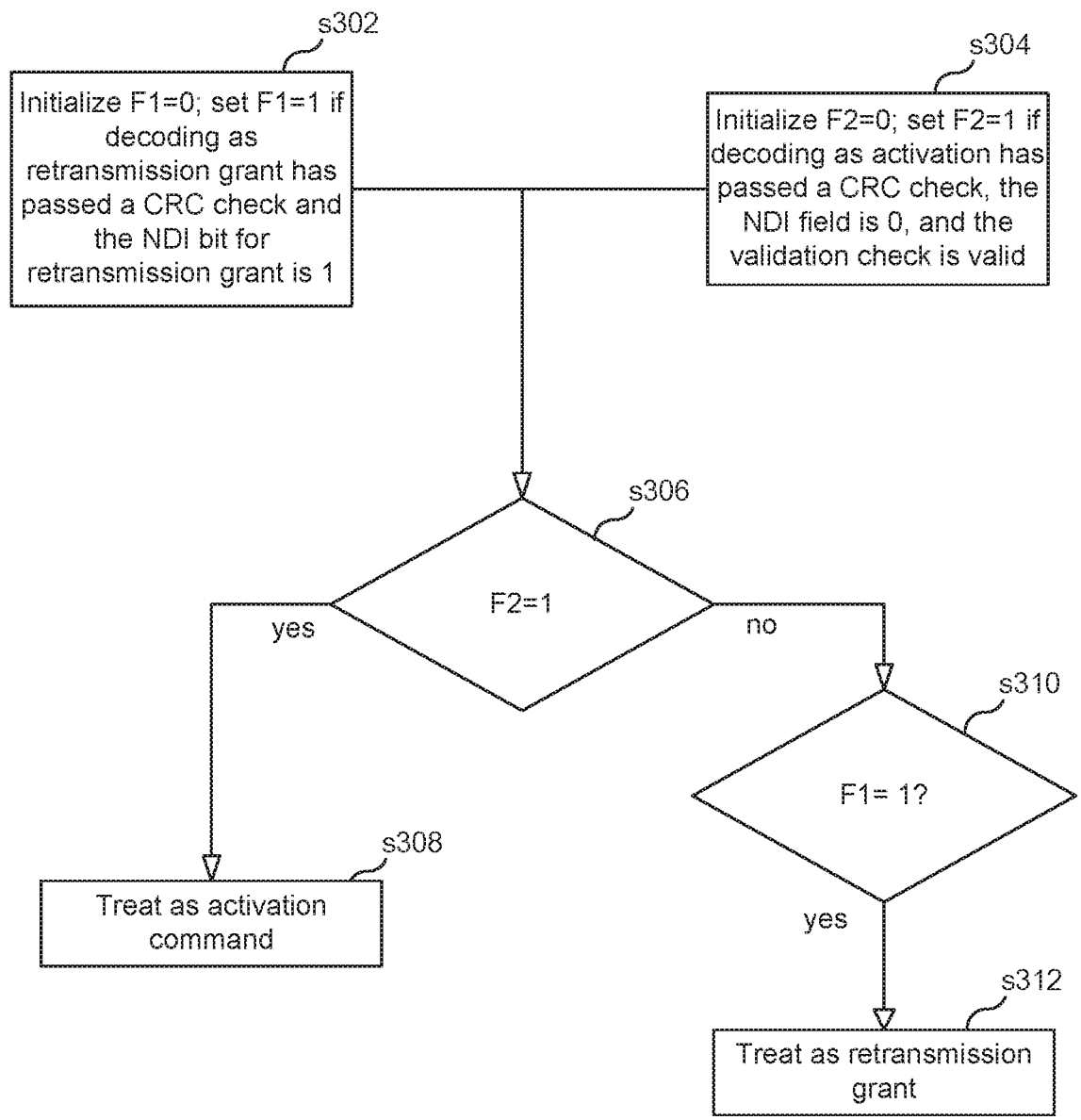
FIG. 3 is a flowchart illustrating a process according to an embodiment.

In one embodiment, a detection of valid activate grant has higher priority than retransmission grant and thus, in the above scenario, the UE will chose to treat the PDCCH as an activation command. On possible implementation of this embodiment is illustrated in FIG. 3 which is a flow chart showing steps performed by the UE. Step s302 and step s304 are performed in parallel. In s302, UE sets a first flag (f2) to a value of 1 if decoding as retransmission grant has passed a CRC check and the NDI bit for retransmission grant is 1. In s304, UE set a second flag (f2) to a value of 1 if decoding as activation has passed a CRC check, the NDI field is 0, and the validation check is valid. In step s306, UE determines whether f2=1. If f2=1, then the UE treats the PDCCH as an activation command (step s308). If f2=0, then UE determines whether f1=1 (step s310). If f1=1, then the UE treats the PDCCH as a retransmission grant (step s312). This illustrates how activation is given priority over retransmission grant.

II.B. Base Station (e.g., gNB) Implementation

The confusion between the two DCI functions only occur if:
(i) the DCI is of format 0_1,
(ii) the NDI field is not aligned between the two functions associated with CSI—i.e., 1) DCI_dynamic: DCI for scheduling retransmission of a TB of Type 2 UL configured grant and 2) DCI_UL_GF: DCI for activation of the Type 2 UL configured grant; and
(iii) the fields used for validation of activation happen to satisfy the criteria of validation. The GF in DCI_UL_GF stands for "grant free," another name for configured grant.

There are 3 fields in DCI format 0_1 that are ahead of NDI, and can have different sizes between DCI_dynamic and DCI_UL_GF. These three fields are: (1) Frequency domain resource assignment (FDRA), (2) Time domain resource assignment (TDRA), and (3) Frequency hopping flag (FH).

Figure 5:
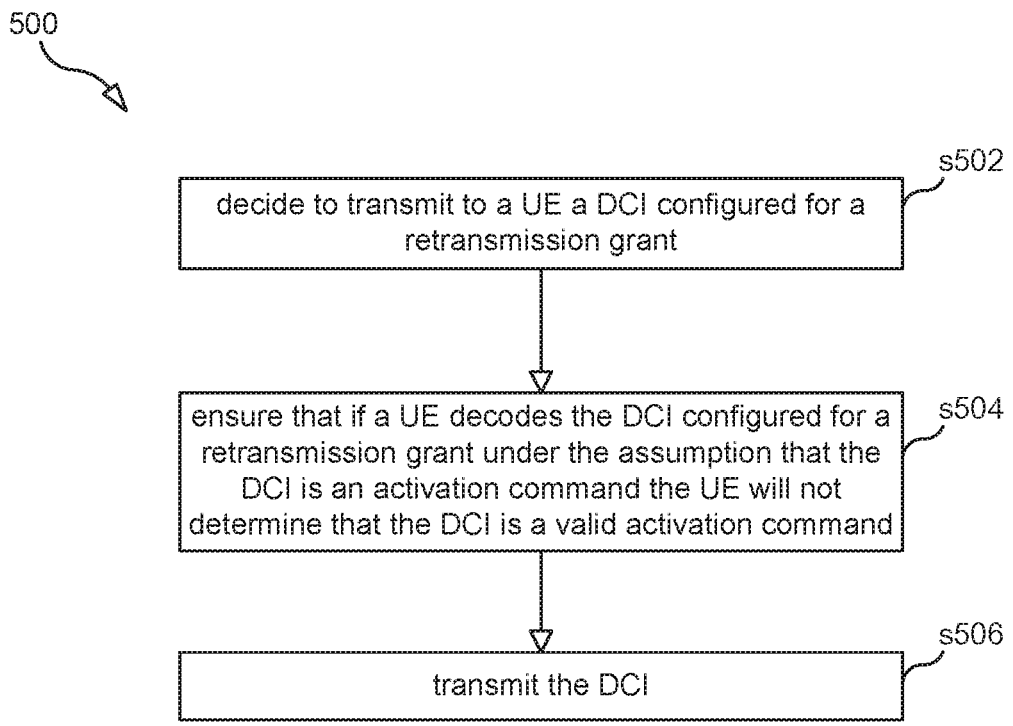
FIG. 5 is a flowchart illustrating a process according to an embodiment.

If the total length of the 3 fields are not the same between the two DCI functions, then, when DCI (of format 0_1) is sent for scheduling retransmission of configured grant, the base station implementation needs to ensure the following condition does not occur: the "fake" NDI field has a value of 0 and the "fake" fields used for validation of activation satisfy the criteria of validation. In the above, the "fake" fields are according to the interpretation that the DCI is for activation, and the FDRA, TDRA, and FH field sizes are determined according to RRC configuration of UL configured grant (i.e., not configuration of dynamic PUSCH). In other words, when DCI (of format 0_1) is sent for scheduling retransmission of configured grant, the base station implementation needs to ensure that if a UE decodes the DCI under the assumption that the DCI is an activation command the UE does not determine that the DCI is valid activation command. This feature is illustrated in FIG. 5 which is a flowchart illustrating a process performed by the base station. The process may begin in step s502, where the base station decides to transmit to a UE a DCI configured for a retransmission grant. In step s504, the base station ensures that if a UE decodes the DCI configured for the retransmission grant under the assumption that the DCI is an activation command the UE will not determine that the DCI is a valid activation command. In step s506, the base station transmits the DCI.

II.C. Alignment of DCI Field Sizes

An alternative method to avoid ambiguity is to ensure that the total length of the sizes of the following three fields do not change between the two DCI functions: (1) Frequency domain resource assignment (FDRA), (2) Time domain resource assignment (TDRA), and (3) Frequency hopping flag (FH). This can be achieved by the following methods.

Method (A): for both DCI_Dynamic and DCI_UL_GF of format 0_1 use non-varying size, similar to that of DCI format 0_0.

Method (B): for both DCI_Dynamic and DCI_UL_GF of format 0_1 use FDRA, TDRA, and FH configuration according to higher layer configuration ConfiguredGrant-Config.

Method (C): for both DCI_Dynamic and DCI_UL_GF of format 0_1 use FDRA, TDRA, and FH configuration according to higher layer configuration PUSCH-Config.

Furthermore, considering the DCI blind decoding burden of UE, it is desirable to align overall size of DCI_dynamic and DCI_UL_GF for format 0_1.

Figure 6:
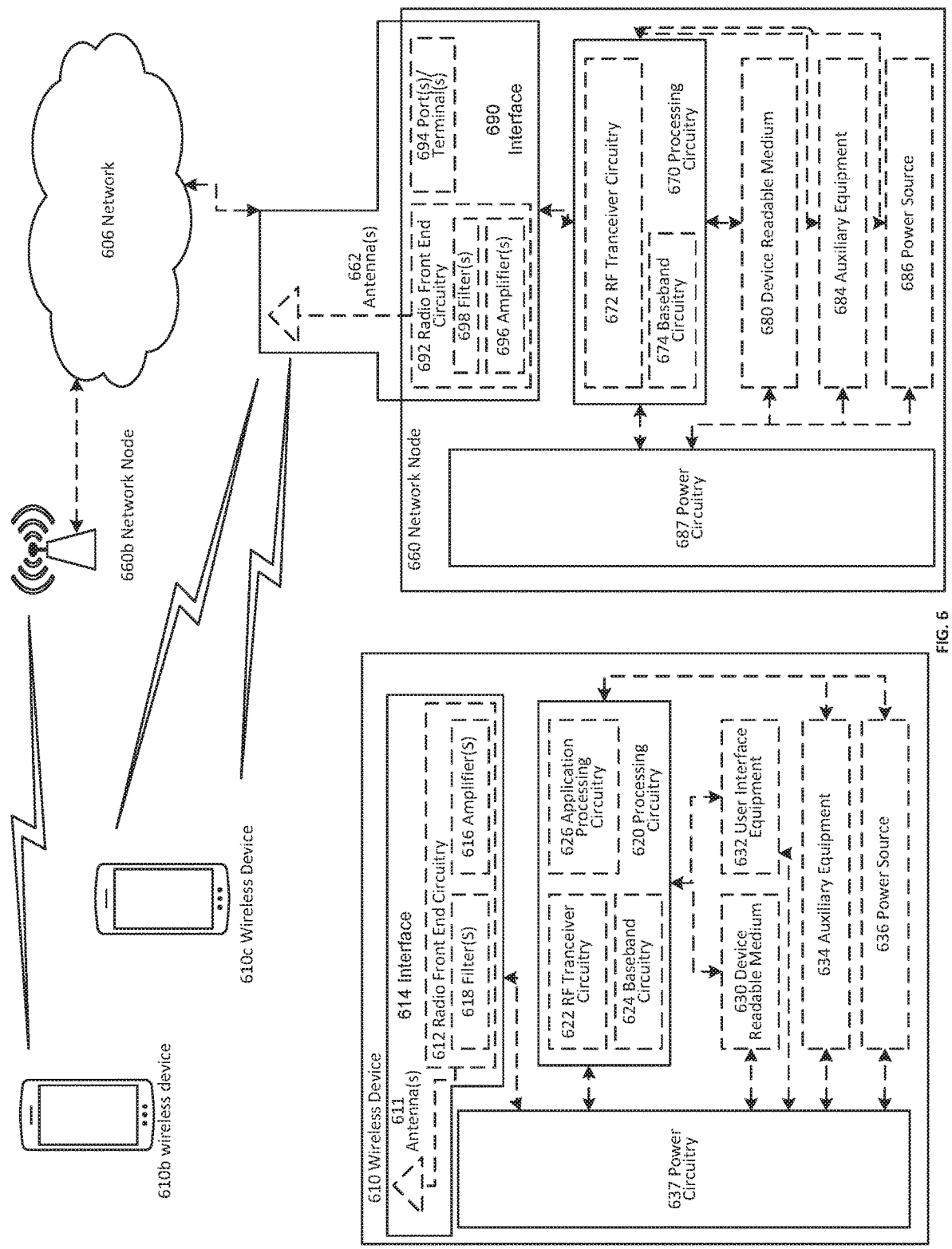
FIG. 6 illustrates an example network.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660*b*, and WDs 610, 610*b*, and 610*c*. In practice, a wireless network may further include any additional elements suitable to support communication between wireless devices or between a wireless device (e.g., a UE) and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, the terms wireless device (WD) and user equipment (UE) both refer to a device capable, configured, arranged and/or operable to communicate wirelessly with network nodes and/or other wireless devices. Accordingly, unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of" one or more of the illustrated components for different wireless technologies supported by WD 610, such as, for example, GSM, WCDMA, MTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
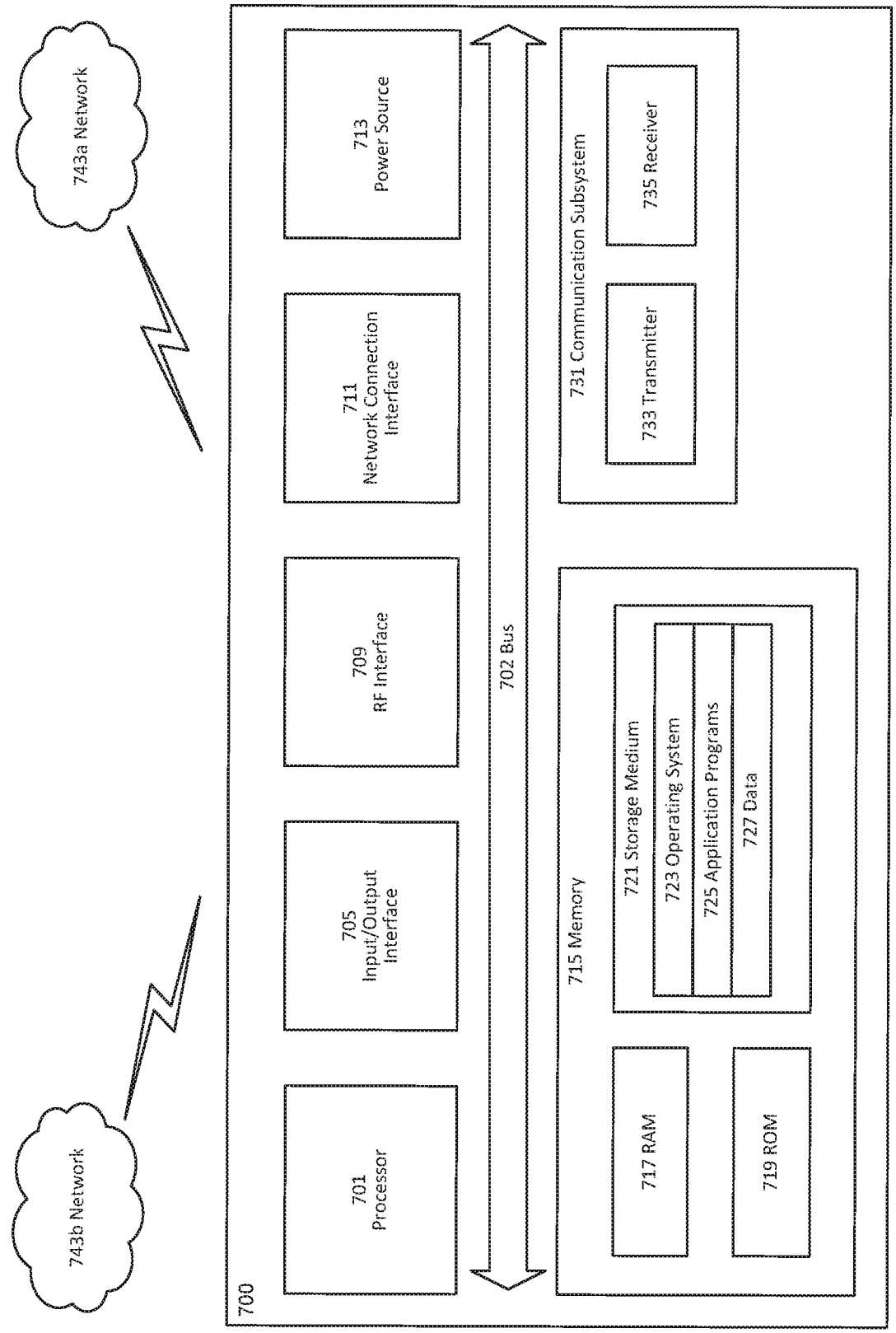
FIG. 7 illustrates a WD according to an embodiment.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 7200 may be any UE identified by the 3rd Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743a. Network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743b using, communication subsystem 731. Network 743a and network 743b may be the same network or networks or different network or networks. Communication subsystem 731 may be configured to include one or more transceivers used to communicate with network 743b. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.7, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743b may encompass wired and/or wireless networks such as a local-area network (LAN), a wide-area network (WAN), a computer network, a wireless network, a telecommunications network, another like network or any combination thereof. For example, network 743b may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
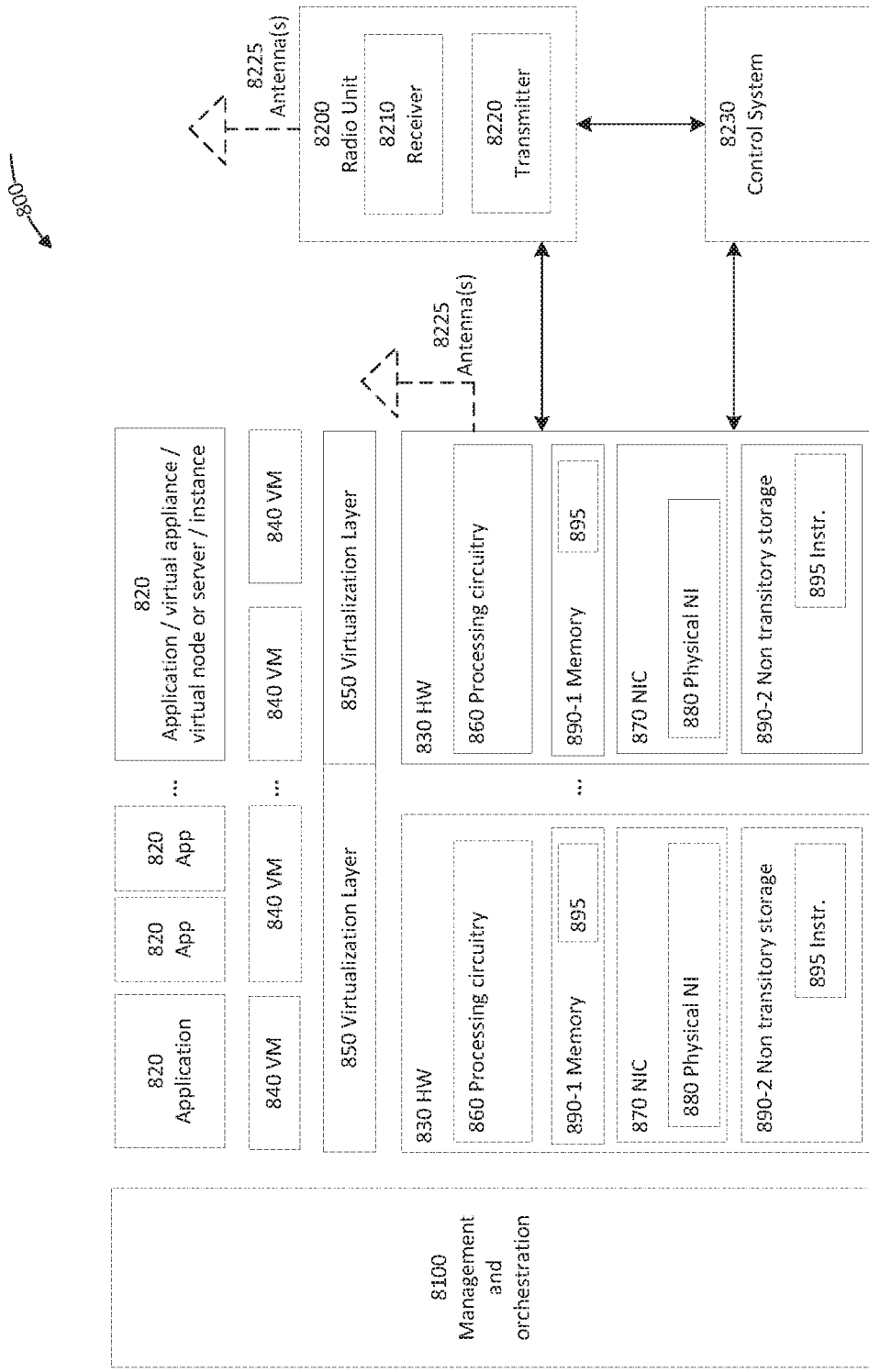
FIG. 8 is a schematic block diagram illustrating a virtualization environment.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 9:
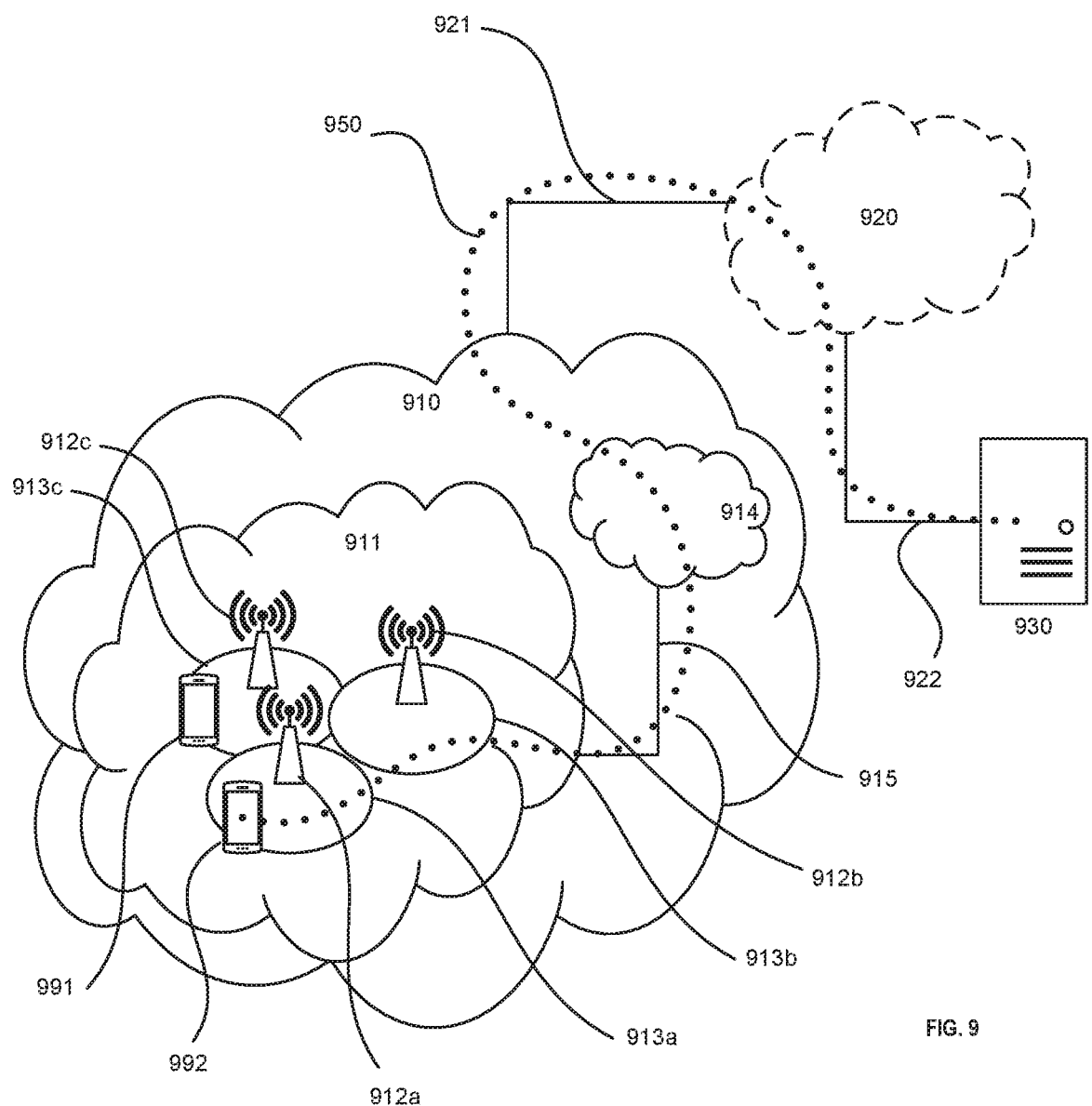
FIG. 9 illustrates a communication system.

With reference to FIG. 9, a communication system in accordance with an embodiment is shown. The illustrated communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more subnetworks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

Figure 10:
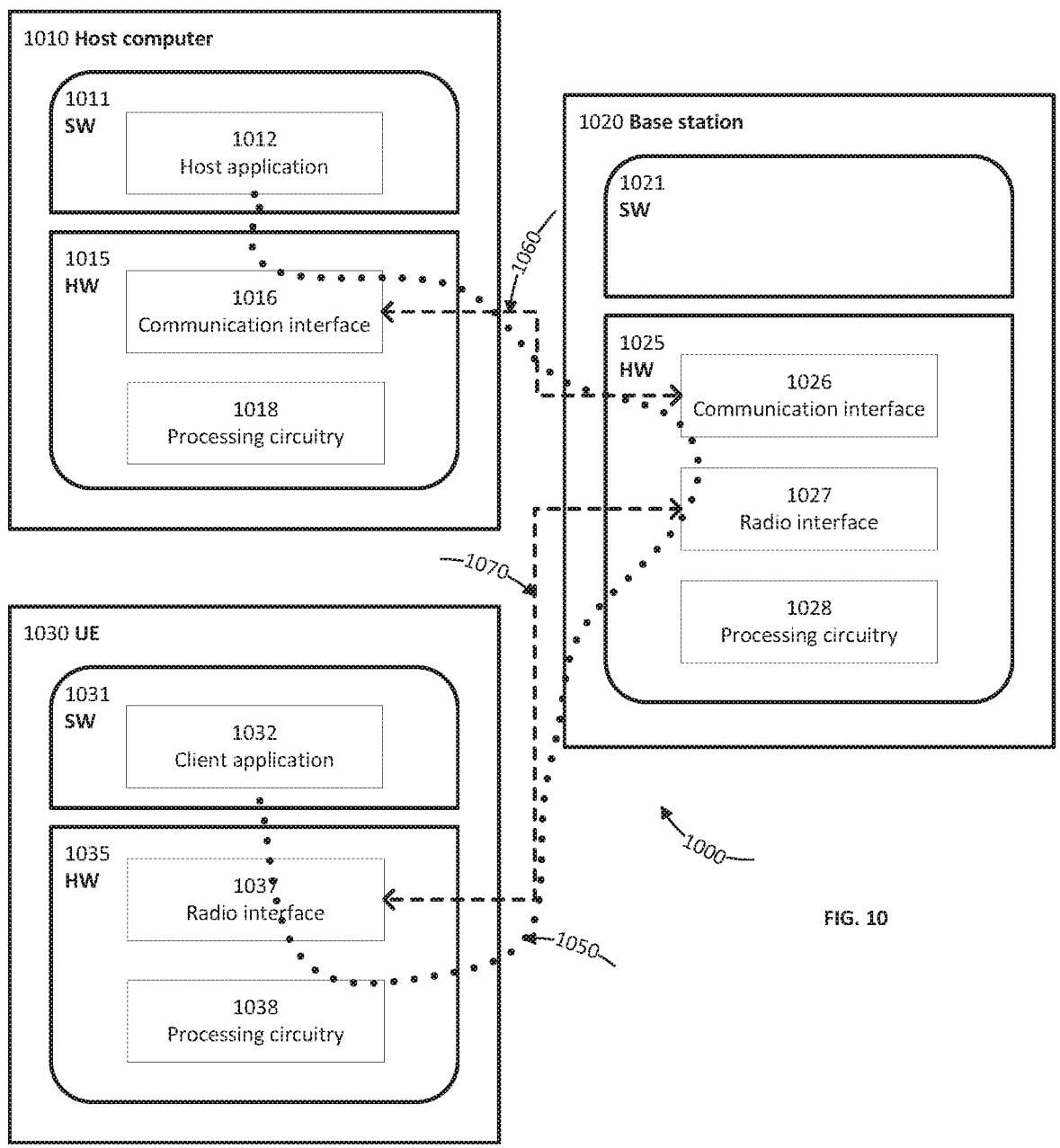
FIG. 10 illustrates an example implementation of a WD and a base station.

It is noted that host computer 1010, base station 1020 and UE 1030 illustrated in FIG. 10 may be similar or identical to host computer 930, one of base stations 912*a*, 912*b*, 912*c* and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of DCI ambiguity embodiments reduce false detections (e.g., reduce likelihood that a UE will wrongly interpret a DCI 0_1), thereby improving performance by decreasing latency and increasing spectrum efficiency, which can lead to higher data rates and longer battery life. Additionally, by including the RRC parameters txConfig, maxRank and codebookSubset in the ConfiguredGrantConfig IE, higher spectrum efficiency and low latency get achieved with supporting multiple layer transmissions for Configured Grant.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
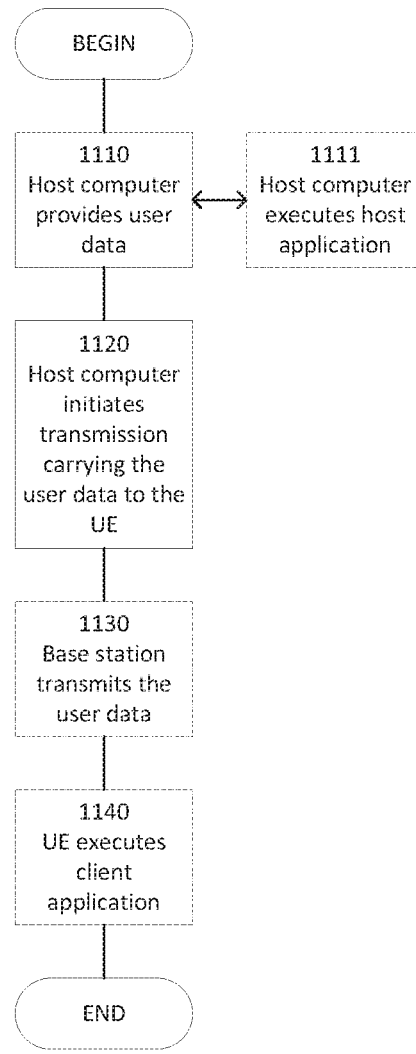
FIGS. 11-14 are flowcharts illustrating different processes according to various embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
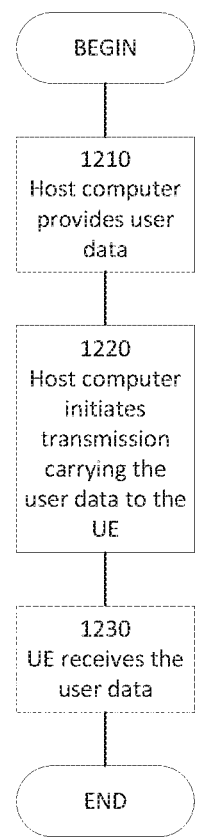

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
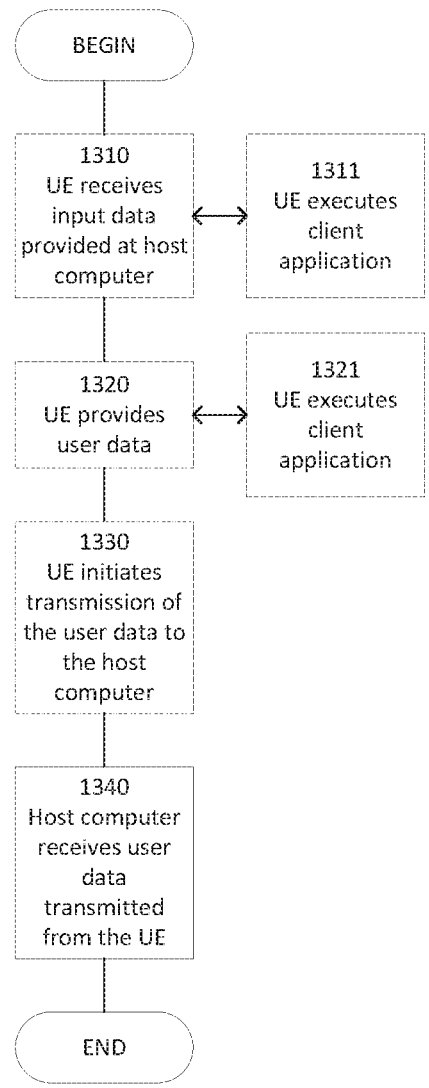

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
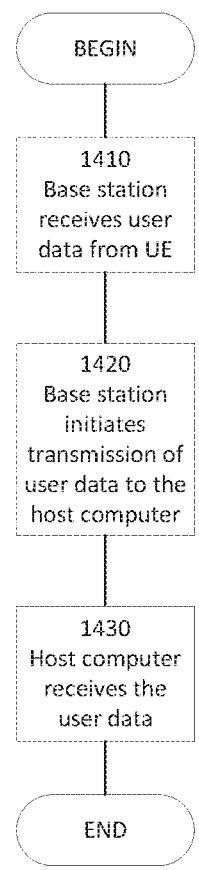

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 15A:
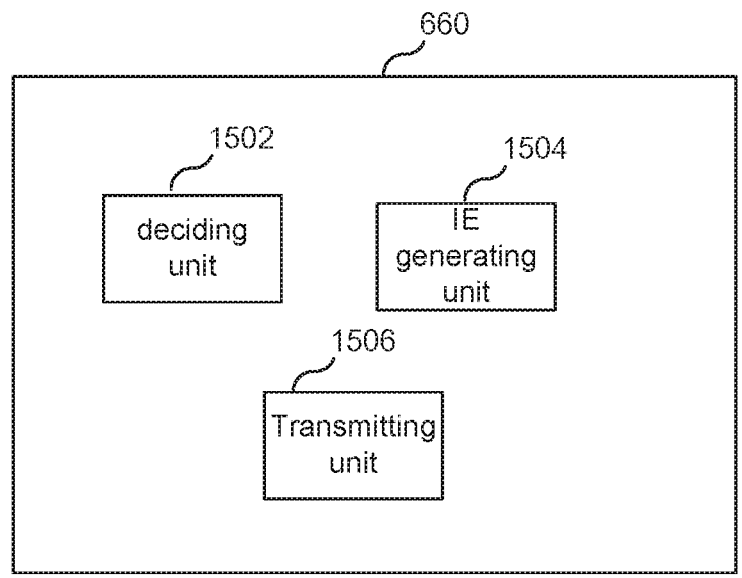
FIG. 15A illustrates a schematic block diagram of network node according to an embodiment.

FIG. 15A illustrates a schematic block diagram of network node 660 according to an embodiment. As illustrated in FIG. 15A, network node 660 includes a deciding unit 1502, an IE generating unit 1504, and a transmitting unit 1506 for performing steps 502, 504, and 506, respectively.

Figure 15B:
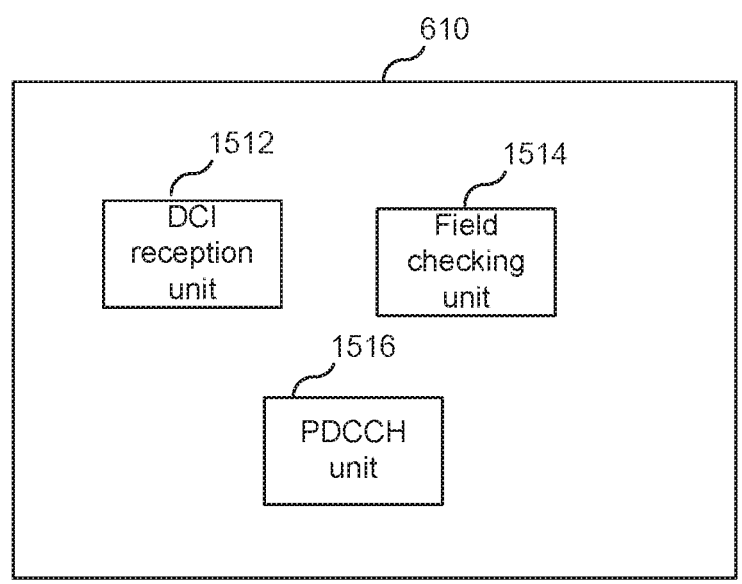
FIG. 15B illustrates a schematic block diagram of a wireless device according to an embodiment.

FIG. 15B illustrates a schematic block diagram of wireless device 610 according to an embodiment. As illustrated in FIG. 15B, wireless device 610 includes: a DCI reception unit 1512 for performing DCI (PDCCH) reception assuming the PDCCH is for activation and for determining whether the content of the PDCCH matches an activation command; a field checking unit 1514 for checking a particular field in the PDCCH (e.g., the bit that is in the position of the NDI field for a activation command) to determine whether the field is set to a value of 0; and a first PDCCH unit 1516 for treating the PDCCH as an activation command as a result of the DCI reception unit determining that the content of the PDCCH matches an activation command and the checking unit 1514 determines that the field is set to a value of 0.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Concise Description of Various Embodiments

UE Embodiments

A1. A method performed by a wireless device, the method comprising at least one of: performing PDCCH reception assuming the PDCCH (e.g., a received PDCCH scrambled with CS-RNTI) is for activation and determining whether the content of the PDCCH matches (or indicates) an activation command; as a result of determining that the content of the PDCCH matches (or indicates) an activation command, checking a particular field in the PDCCH (e.g., the bit that is in the position of the NDI field for a activation command) to determine whether the field (e.g., bit) is set to a value of 0; and as a result of determining that that the field is 0, treating the PDCCH as an activation command.

A2. The method of embodiment A1, further comprising determining whether the content of the PDCCH indicates configured grant Type 2 activation; and, optionally, as a result of determining that the content of the PDCCH indicates configured grant Type 2 activation, triggering configured uplink grant confirmation.

A3. The method of embodiment A2, further comprising: as a result of determining that the content of the PDCCH s indicates configured grant Type 2 activation, storing an uplink grant and associated HARQ information as configured uplink grant and, optionally, initialising or re-initialising the configured uplink grant for the Serving Cell to start in an associated PUSCH duration and, optionally, to recur according to rules.

A4. A method performed by a wireless device, the method comprising at least one of: the wireless device successfully decoding a PDCCH as a retransmission grant; the wireless device successfully decoding the PDCCH as an activation command; and the wireless device choosing based on priority whether to treat the PDCCH as a retransmission grant or as an activation command.

A5. The method of any of the previous embodiments, further comprising: providing user data; and forwarding the user data to a host computer via a transmission to the base station.

Base Station Embodiments

B1. A method performed by a base station, the method comprising at least one of: the base station deciding to configure a UE for uplink transmission without dynamic grant; as a result of deciding to configure the UE for uplink transmission without dynamic grant, the base station generating a ConfiguredGrantConfig IE, wherein, optionally, the ConfiguredGrantConfig IE includes one or more of the following RRC parameters txConfig, maxRank and codebookSubset; and the base station transmitting the ConfiguredGrantConfig IE to the UE.

B2. The method of embodiment B1, wherein transmitting the ConfiguredGrantConfig IE comprises at least one of the base station generating a BWP-UplinkDedicated IE, which, optionally, is used to configure the dedicated (UE specific) parameters of an uplink Bandwidth Part (BWP); and the base station transmitting to the UE the BWP-UplinkDedicated IE which, optionally, includes the generated ConfiguredGrantConfig IE.

B3. The method of embodiment B2, wherein the BWP-UplinkDedicated IE further includes a PUSCH-Config IE that, optionally, contains parameter values for the one or more of RRC parameters txConfig, maxRank and codebookSubset.

B4. The method of embodiment B3, wherein the parameter values for the RRC parameters txConfig, maxRank and codebookSubset included in the PUSCH-Config IE are different than the parameter values for the RRC parameters txConfig, maxRank and codebookSubset included in the ConfiguredGrantconfig IE.

B5. A method performed by a base station, the method comprising at least one of: the base station deciding to transmit to a UE a DCI configured for a retransmission grant; the base station ensuring that if a UE decodes the DCI configured for the retransmission grant under the assumption that the DCI is an activation command the UE will not determine that the DCI is a valid activation command; and the base station transmuting the DCI.

B6. The method of any of the embodiments B1-B5, further comprising at least one of: obtaining user data; and forwarding the user data to a host computer or a wireless device.

Group C Embodiments

C1. A wireless device, the wireless device comprising: processing circuitry configured to perform any of the steps of any of the Group A embodiments; and power supply circuitry configured to supply power to the wireless device.

C2. A base station, the base station comprising: processing circuitry configured to perform any of the steps of any of the Group B embodiments; power supply circuitry configured to supply power to the wireless device.

C3. A user equipment (UE) for, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

C4. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

C5. The communication system of the pervious embodiment further including the base station.

C6. The communication system of the previous 2 embodiments, further including the UE, wherein the UE is configured to communicate with the base station.

C7. The communication system of the previous 3 embodiments, wherein: the processing circuitry of the host computer is configured to execute a host application, thereby providing the user data; and the UE comprises processing circuitry configured to execute a client application associated with the host application.

C8. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B embodiments.

C9. The method of the previous embodiment, further comprising, at the base station, transmitting the user data.

C10. The method of the previous 2 embodiments, wherein the user data is provided at the host computer by executing a host application, the method further comprising, at the UE, executing a client application associated with the host application.

C11. A user equipment (UE) configured to communicate with a base station, the UE comprising a radio interface and processing circuitry configured to performs the of the previous 3 embodiments.

C12. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

C13. The communication system of the previous embodiment, wherein the cellular network further includes a base station configured to communicate with the UE.

C14. The communication system of the previous 2 embodiments, wherein: the processing circuitry of the host computer is configured to execute a host application, thereby providing the user data; and the UE's processing circuitry is configured to execute a client application associated with the host application.

C15. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A embodiments.

C16. The method of the previous embodiment, further comprising at the UE, receiving the user data from the base station.

C17. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A embodiments.

C18. The communication system of the previous embodiment, further including the UE.

C19. The communication system of the previous 2 embodiments, further including the base station, wherein the base station comprises a radio interface configured to communicate with the UE and a communication interface configured to forward to the host computer the user data carried by a transmission from the UE to the base station.

C20. The communication system of the previous 3 embodiments, wherein: the processing circuitry of the host computer is configured to execute a host application; and the UE's processing circuitry is configured to execute a client application associated with the host application, thereby providing the user data.

C21. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

C22. A method implemented in a communication system including a host computer, a base station and a user equipment (UE), the method comprising: at the host computer, receiving user data transmitted to the base station from the UE, wherein the UE performs any of the steps of any of the Group A embodiments.

C23. The method of the previous embodiment, further comprising, at the UE, providing the user data to the base station.

C24. The method of the previous 2 embodiments, further comprising: at the UE, executing a client application, thereby providing the user data to be transmitted; and at the host computer, executing a host application associated with the client application.

C25. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

C26. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

C27. The communication system of the previous embodiment further including the base station.

C28. The communication system of the previous 2 embodiments, further including the UE, wherein the UE is configured to communicate with the base station.

C29. The communication system of the previous 3 embodiments, wherein: the processing circuitry of the host computer is configured to execute a host application; the UE is configured to execute a client application associated with the host application, thereby providing the user data to be received by the host computer.

C30. A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A embodiments.

C31. The method of the previous embodiment, further comprising at the base station, receiving the user data from the UE.

C32. The method of the previous 2 embodiments, further comprising at the base station, initiating a transmission of the received user data to the host computer.

While various embodiments of the present disclosure are described herein, it should be understood that they have been presented by way of example only, and not limitation. Thus, the breadth and scope of the present disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] TS 38.212

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
ABS Almost Blank Subframe
ARQ Automatic Repeat Request
AWGN Additive White Gaussian Noise BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
CS-RNTI Configured Scheduling RNTI
DCCH Dedicated Control Channel
DCI Downlink Control Information
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN Node
BePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
L1 Layer 1
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW. Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP. Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

APPENDIX

This appendix is a draft of a contribution to be submitted for consideration.

2.1 Inconsistent RRC Configurations for Type 2 Configured Grant

The RRC parameter txConfig, maxRank and codebookSubset that related to multi-antenna and multiple layer transmission are absent from type 2 configured grant configuration. In 3GPP TS 38.214 6.1.1 states that, if the higher layer parameter txConfig is not configured, the UE is not expected to be scheduled by DCI format 0_1.

The ConfiguredGrantConfig contains resourceAllocation alternatives for type 2 that only can be used for DCI 0_1.

A way to mitigate the configuration problem is to clarify in TS 38.214 6.1.1 regarding transmission schemes for configured grant.

Proposal 1: Adopt the text proposals provided in section 2.1.

---

>>>Text Proposal for TS 38.214 Section 6.1.2.3>>>
- For Type 2 PUSCH transmissions with a configured grant: the resource allocation follows the higher layer configuration according to [10, TS 38.321], and UL grant received on the DCI. The configuration for txConfig, maxRank and codebookSubset follow PUSCH-Config.
>>>End Text Proposal >>>

---

An alternative way is to add those missing parameters into the type 2 configuration in ConfiguredGrantConfig Proposal 2: Include txConfig, maxRank and codebook-Subset in the ConfiguredGrantConfig

2.2 Retransmission of Configured Grant

It was discussed at the RAN #94 meeting how to handle the ambiguity among activation, deactivation and retransmission that might occur for UE at receiving PDCCH scrambled with CS-RNTI. For retransmission of configured grant that applies PUSCH-Config IE the DCI bit field can be different from the PDCCH for activation and deactivation applies ConfiguredGrantConfig. The NDI flag used to indicate an activation or retransmission can present at a different place in PDCCH and therefore cause some problem for UE to detect and interpret the received PDCCH.

The DCI bit field of NDI in the activate signal can be other field (location) in retransmission signal. FIG. 17 illustrates the DCI when the frequency hopping is enabled in dynamic grant but disabled for configured grant.

The ambiguity illustrated in FIG. 17 can only occur if the DCI is of DCI format 0_1, which is the normal DCI for scheduling PUSCH. This is because the length of FDRA, FH and TDRA fields can vary according to configuration, and these fields are ahead of the NDI field in DCI format 0_1.

There are 3 fields in DCI format 0_1 that are ahead of NDI, and can have different sizes between DCI_dynamic and DCI_UL_GF: Frequency domain resource assignment (FDRA), Time domain resource assignment (TDRA), Frequency hopping flag (FH).

Validation of Activation Signal:

TABLE 10.2-1

Special Fields for DL SPS and UL grant Type 2 scheduling activation PDCCH validation

|  | DCI Format 0_0/0_1 | DCI format 1_0 | DCI format 1_1 |
|---|---|---|---|
| HARQ Process No. | Set to all '0's | Set to all '0's | Set to all '0's |
| Redundancy version | Set to all '00' | Set to all '00' | For the enabled transport block set to '00' |

The IE for configured grant and normal transmission should not differ much for same UE and same network. The network may ensure that the DCI field interpretation will not cause ambiguity for that UE. Either network configuration aligns the two IEs that the DCI field are matched at the bit of NDI, or network choose different configuration for the two IEs but make sure that the validation field shall be sufficient for UE to differentiate the retransmission from other 2 DCI formats addressing activation and deactivation. It is the network's issue to guarantee that there should be minimum ambiguity for the configured grant mechanism to work, no further modification is needed in DCI format regarding the retransmission issue.

From network configuration perspective, the PUSCH-Config shall be addressed with best UE capability, and configure grant configuration should be a subset under the PUSCH configuration. Retransmission of configured grant is dynamically triggered by pdcch and therefore follows the PUSCH-Config that is designed for dynamic grant.

Proposal 3: Configure Grant Retransmission Shall Apply PUSCH-Config Configuration.

Observation 1: Network can avoid sending ambiguity DCIs by:

a) Ensure that the total length of the sizes of the following three fields do not change between the two DCI functions: i) Frequency domain resource assignment (FDRA); ii) Time domain resource assignment (TDRA), Frequency hopping flag (FH);

b) Ensure the "fake" DCI field of NDI and "fake" validation values to be invalid in a retransmission.

Proposal 4: UE detection should prioritize the valid detection of activation/deactivation than retransmission.

Proposal 5: Send LS to RAN2 and adopt the text proposals provided section 2.2

---

>>> Text Proposal for 38.321 Section 5.4.1>>>
. . .
1> else if an uplink grant for this PDCCH occasion has been received for this Serving Cell on the PDCCH for the MAC entity's CS-RNTI:
   2> if the NDI follows activation or deactivation DCI in the received HARQ information is 0:
      3> if PDCCH contents indicate configured grant Type 2 deactivation:
         4> trigger configured uplink grant confirmation.
      3> else if PDCCH contents indicate configured grant Type 2 activation:
         4> trigger configured uplink grant confirmation;
         4> store the uplink grant for this Serving Cell and the associated HARQ information as configured uplink grant;
         4> initialise or re-initialise the configured uplink grant for this Serving Cell to start in the associated PUSCH duration and to recur according to rules in subclause 5.8.2;
         4> set the HARQ Process ID to the HARQ Process ID associated with this PUSCH duration;

-continued

```
    4> consider the NDI bit for the corresponding HARQ process to have been toggled;
    4> stop the configuredGrantTimer for the corresponding HARQ process, if running;
    4> deliver the configured uplink grant and the associated HARQ information to the
HARQ entity.
  3> else if the PDCCH content is not valid for activation or deactivation:
    4>if the NDI follows retransmission DCI in the received HARQ information is 1:
      5> consider the NDI for the corresponding HARQ process not to have been toggled;
      5> start or restart the configuredGrantTimer for the corresponding HARQ process, if
configured;
      5> deliver the uplink grant and the associated HARQ information to the HARQ entity.
>>> End Text Proposal >>>
```

2.3 Deactivation of SPS DL and Type 2 Configured Grant

It is not clear in 38.213 on which DCI field to use for the validation of release signal.

"Resource block assignment" shall align with the naming in DCI format that is the "Frequency domain resource alignment".

Proposal 6: Adopt the text proposal provided in section 2.3

Text Proposal for 38.213 Section 10.2>>>

TABLE 10.2-2

Special fields for DL SPS and UL grant Type 2 scheduling release PDCCH validation

| | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Frequency domain resource assignment | set to all '1's | set to all '1's |

>>>End Text Proposal>>>

OTHER TEXT PROPOSAL FOR SCHEDULING AND HARQ
3.1 TP for 38.212:
>>>Text Proposal for 38.212 Section 6.3.2.1.1 >>>
6.3.2.1.1    HARQ-ACK
If HARQ-ACK bits are transmitted on a PUSCH, the UCI bit sequence $a_0, a_1, a_2, a_3, \ldots, a_{A-1}$ is determined as follows:
- If UCI is transmitted on PUSCH without UL-SCH and the UCI includes CSI part 1 without CSI part 2,
    - if there is no HARQ-ACK bit given by Subclause 9.1 of [5, TS 38.213], set $a_0 = 0$, $a_1 = 0$, and $A = 2$ ;
    - if there is only one HARQ-ACK bit $õ_0^{ACK}$ given by Subclause 9.1 of [5, TS 38.213], set $a_0 = õ_0^{ACK}$, $a_1 = 0$, and $A = 2$;
    - otherwise, set $a_i = õ_i^{ACK}$, i for $i=0,1,\ldots,O^{ACK}-1$ and $A = O^{ACK}$, where the HARQ-ACK bit sequence $õ_0^{ACK}, õ_1^{ACK}, \ldots, õ_{O^{ACK}-1}^{ACK}$ is given by Subclause 9.1 of [5, TS 38.213].
>>>End Text Proposal >>>

The invention claimed is:

1. A method performed by a wireless device, the method comprising:

performing a physical downlink control channel (PDCCH) reception, thereby receiving content of the PDCCH;

determining whether the content of the PDCCH matches or indicates an activation command based at least in part on HARQ process number and redundancy version values of the received PDCCH;

as a result of determining that the content of the PDCCH matches or indicates the activation command, checking a particular field in the content of the PDCCH to determine whether the field is set to a first value; and as a result of determining that that the particular field is set to the first value, treating the content of the PDCCH as an activation command.

2. The method of claim 1, wherein the content of the PDCCH comprises downlink control information (DCI) comprising a new data indicator (NDI) field, and checking the particular field in the content of the PDCCH to determine whether the field is set to the particular value comprises checking the NDI field to determine whether the NDI field is set to the first value.

3. The method of claim 1, further comprising determining whether the content of the PDCCH indicates configured grant Type 2 activation.

4. The method of claim 3, further comprising:

as a result of determining that the content of the PDCCH indicates configured grant Type 2 activation, triggering configured uplink grant confirmation.

5. The method of claim 3, further comprising:

as a result of determining that the content of the PDCCH indicates configured grant Type 2 activation, storing an uplink grant and associated HARQ information as configured uplink grant and initialising or re-initialising the configured uplink grant for the serving cell to start in an associated PUSCH duration.

6. The method of claim 1 further comprising:

as a result of determining that the content of the PDCCH does not match or indicate the activation command, checking the particular field in the content of the PDCCH to determine whether the field is set to a second value; and as a result of determining that that the particular field is set to the second value, treating the content of the PDCCH as retransmission grant.

7. The method of claim 1, further comprising:

as a result of determining that the particular field is not set to the first value, checking the particular field to determine whether the field is set to a second value; and as a result of determining that that the particular field is set to the second value, treating the content of the PDCCH as retransmission grant.

8. The method of claim 1, further comprising:
as a result of determining that the content of the PDCCH does not match or indicate the activation command, treating the content of the PDCCH as retransmission grant.

9. A wireless device (WD), the WD comprising:
at least one processor; and
a non-transitory memory including software instructions configured to control the WD to perform steps of:
   performing a physical downlink control channel (PDCCH) reception, thereby receiving content of the PDCCH;
   determining whether the content of the PDCCH matches or indicates an activation command based at least in part on HARQ process number and redundancy version values of the received PDCCH;
   as a result of determining that the content of the PDCCH matches or indicates the activation command, checking a particular field in the content of the PDCCH to determine whether the field is set to a first value; and
   as a result of determining that that the particular field is set to the first value, treating the content of the PDCCH as an activation command.

* * * * *